United States Patent
Chen et al.

(10) Patent No.: US 11,197,317 B2
(45) Date of Patent: Dec. 7, 2021

(54) TECHNIQUES FOR DETERMINING A SYMBOL PERIOD FOR A STARTING SYMBOL OF A TRANSMISSION IN A SHARED RADIO FREQUENCY SPECTRUM

(71) Applicant: QUALCOMM Incorporated, San Diego, CA (US)

(72) Inventors: Wanshi Chen, San Diego, CA (US); Srinivas Yerramalli, San Diego, CA (US); Tao Luo, San Diego, CA (US); Peter Gaal, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 14/971,082

(22) Filed: Dec. 16, 2015

(65) Prior Publication Data

US 2016/0183302 A1   Jun. 23, 2016

Related U.S. Application Data

(60) Provisional application No. 62/096,249, filed on Dec. 23, 2014.

(51) Int. Cl.
*H04W 74/08* (2009.01)
*H04W 24/08* (2009.01)
(Continued)

(52) U.S. Cl.
CPC ....... *H04W 74/0808* (2013.01); *H04L 5/0091* (2013.01); *H04W 16/14* (2013.01);
(Continued)

(58) Field of Classification Search
CPC ............. H04W 16/14; H04W 74/0808; H04W 72/0446; H04W 72/042; H04W 84/12; H04W 72/0453; H04W 74/0816
See application file for complete search history.

(56) References Cited

U.S. PATENT DOCUMENTS

| 8,522,101 B2 | 8/2013 | Luo |
| 8,792,426 B2 | 7/2014 | Montojo et al. |
| 2011/0188460 A1 | 8/2011 | Malladi et al. |

(Continued)

FOREIGN PATENT DOCUMENTS

| CN | 103874207 A | 6/2014 |
| WO | WO-2009120662 A1 | 10/2009 |

(Continued)

OTHER PUBLICATIONS

ISA/EPO, International Search Report and Written Opinion of the International Searching Authority, Int'l. App. No. PCT/US2015/66458, dated Mar. 18, 2016, European Patent Office, Rijswijk, NL, 13 pgs.

(Continued)

*Primary Examiner* — Asad M Nawaz
*Assistant Examiner* — Najeeb Ansari
(74) *Attorney, Agent, or Firm* — Holland & Hart LLP

(57) ABSTRACT

Techniques are described for wireless communication. A first method includes monitoring, by a first wireless device, at least one predetermined symbol period of a subframe for an indication that a second wireless device has obtained access to a shared radio frequency spectrum; determining a starting symbol for a transmission by the second wireless device over the shared radio frequency spectrum based on detecting the indication; and receiving the transmission by the second wireless device over the shared radio frequency spectrum based on the determined starting symbol.

17 Claims, 22 Drawing Sheets

(51) Int. Cl.
*H04W 16/14* (2009.01)
*H04L 5/00* (2006.01)
*H04L 27/00* (2006.01)

(52) U.S. Cl.
CPC ............. *H04W 24/08* (2013.01); *H04L 5/001* (2013.01); *H04L 5/003* (2013.01); *H04L 27/0006* (2013.01)

(56) References Cited

U.S. PATENT DOCUMENTS

| | | | |
|---|---|---|---|
| 2014/0211703 A1* | 7/2014 | Seok | H04W 52/367 370/329 |
| 2014/0341018 A1 | 11/2014 | Bhushan et al. | |
| 2015/0289208 A1* | 10/2015 | Liu | H04L 1/1887 370/252 |
| 2015/0372778 A1* | 12/2015 | Xu | H04J 11/005 370/329 |
| 2016/0043843 A1* | 2/2016 | Liu | H04W 72/042 370/329 |
| 2016/0066325 A1* | 3/2016 | Kim | H04W 74/0816 370/329 |
| 2016/0234706 A1* | 8/2016 | Liu | H04L 5/0048 |
| 2016/0381690 A1* | 12/2016 | Kim | H04W 72/08 370/329 |
| 2017/0005775 A1* | 1/2017 | Cheng | H04L 5/0098 |
| 2017/0034851 A1* | 2/2017 | Kwon | H04W 74/0808 |
| 2017/0111913 A1* | 4/2017 | Li | H04W 72/04 |
| 2017/0141859 A1* | 5/2017 | Seo | H04B 17/24 |
| 2017/0142737 A1* | 5/2017 | Zheng | H04W 72/085 |
| 2017/0188323 A1* | 6/2017 | Bhushan | H04L 5/0053 |
| 2017/0223742 A1* | 8/2017 | Shimomura | H04W 16/28 |
| 2017/0238320 A1* | 8/2017 | Fukuta | H04W 16/14 370/329 |
| 2017/0238372 A1* | 8/2017 | Snider | H05B 3/84 219/203 |
| 2017/0251497 A1* | 8/2017 | Larsson | H04W 74/0816 |
| 2017/0280479 A1* | 9/2017 | Frenne | H04W 16/14 |
| 2017/0303220 A1* | 10/2017 | Sadeghi | H04W 72/042 |
| 2017/0339693 A1* | 11/2017 | Cierny | H04W 16/14 |

FOREIGN PATENT DOCUMENTS

| WO | WO-2009129343 A1 | 10/2009 |
|---|---|---|
| WO | WO-2014189909 A2 | 11/2014 |

OTHER PUBLICATIONS

ITL Inc., "Discussion on Channel Access Mechanism Based on LBT for LAA," 3GPP TSG RAN WG1 Meeting #79, R1-145109, San Francisco, USA, Nov. 17-21, 2014, 6 pgs., 3rd Generation Partnership Project.

ITL Inc., "The On/Off State Indication of SCell in LAA Unlicensed Carrier for DL Measurement," 3GPP TSG RAN WG1 Meeting #79, R1-145110, San Francisco, USA, Nov. 17-21, 2014, 3 pgs., 3rd Generation Partnership Project.

Nvidia, Discussion on Potential Solutions for LAA-LTE, 3GPP TSG RAN WG1 #79, R1-145013, San Francisco, USA, Nov. 17-21, 2014, 7 pgs., 3rd Generation Partnership Project.

Qualcomm Incorporated: "Candidate Solutions for LAA-LTE", 3GPP Draft; 3GPP TSG-RAN WG1#79, R1-145084, 3rd Generation Partnership Project (3GPP), Mobile Competence Centre, 658, Route Des Lucioles, F-86921, Sophia-Antipolis Cedex, France, vol. RAN WG1, No. San Francisco, USA, 20141117-20141121, Nov. 17, 2014 (Nov. 17, 2014), 7 Pages, XP050876118, Retrieved from the Internet: URL: http://www.3gpp.org/ftp/Meetings_3GPP_SYNC/RAN1/Docs/ [retrieved on Nov. 17, 2014] sections 1-3, Sections 1-2, Fig.2.2-1.

ZTE: "Analysis of PHY Layer Solutions for LAA Design", 3GPP TSG-RAN WG1 #79, R1-144825, URL : http://www.3gpp.org/ftp/tsg_ran/WG1_RL1/TSGR1_79/Docs/R1-144825.zip, pp. 1-8.

Taiwan Search Report—TW104142766—TIPO—dated Mar. 2, 2019.

\* cited by examiner

TECHNIQUES FOR DETERMINING A SYMBOL PERIOD FOR A STARTING SYMBOL OF A TRANSMISSION IN A SHARED RADIO FREQUENCY SPECTRUM

CROSS REFERENCES

The present Application for Patent claims priority to U.S. Provisional Patent Application No. 62/096,249 by Chen et al., entitled "TECHNIQUES FOR DETERMINING A SYMBOL PERIOD FOR A STARTING SYMBOL OF A TRANSMISSION IN A SHARED RADIO FREQUENCY SPECTRUM," filed Dec. 23, 2014, assigned to the assignee hereof, and expressly incorporated by reference herein.

BACKGROUND

Field of the Disclosure

The present disclosure, for example, relates to wireless communication systems, and more particularly to techniques for determining a symbol period for a starting symbol of a transmission in a shared radio frequency spectrum.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems may include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

Some modes of communication may enable communication between a base station and a UE over a shared radio frequency spectrum, or over different radio frequency spectrums (e.g., a dedicated radio frequency spectrum and a shared radio frequency spectrum) of a cellular network. With increasing data traffic in cellular networks that use a dedicated (e.g., licensed) radio frequency spectrum, offloading of at least some data traffic to a shared radio frequency spectrum may provide a cellular operator with opportunities for enhanced data transmission capacity. A shared radio frequency spectrum may also provide service in areas where access to a dedicated radio frequency spectrum is unavailable.

Prior to gaining access to, and communicating over, a shared radio frequency spectrum, a base station or UE may perform a listen before talk (LBT) procedure to contend for access to the shared radio frequency spectrum. An LBT procedure may include performing a clear channel assessment (CCA) procedure to determine whether a channel of the shared radio frequency spectrum is available. When it is determined that the channel of the shared radio frequency spectrum is available, the base station or UE may transmit one or more channel reservation signals (e.g., one or more channel usage beacon signals (CUBS)) over the channel, to reserve the channel. The channel reservation signal(s) may be transmitted over the channel until a next subframe boundary, at which time a data or control transmission may be made over the channel.

SUMMARY

The present disclosure, for example, relates to one or more techniques for determining a symbol period for a starting symbol of a transmission in a shared radio frequency spectrum. As described above, upon winning contention for access to a shared radio frequency spectrum, one or more channel reservation signals may be transmitted over the channel, between a time at which the contention for access to the channel is won and a next subframe boundary. A data or control transmission may begin at the next subframe boundary. However, transmission efficiency may be improved, under some scenarios, if the one or more channel reservation signals are transmitted over the channel for a shorter duration or not at all. A data or control transmission may then begin during a symbol period of the subframe in which contention for access to the shared radio frequency spectrum is won. Because it may be inefficient for a receiving apparatus to monitor each symbol period of a subframe for a starting symbol of a data or control transmission, or because it may be undesirable to transmit a starting symbol during certain symbol periods, or for other reasons, it may be useful for a transmitting apparatus to transmit, to a receiving apparatus, an indication that the transmitting apparatus has obtained access to the shared radio frequency spectrum. The indication may be transmitted during a predetermined symbol period of a subframe, or in one of a plurality of predetermined symbol periods of the subframe, and may convey a symbol period including the starting symbol of the data or control transmission. In some cases, the predetermined symbol period may be signaled to the receiving apparatus by a radio resource control (RRC) message.

In a first set of illustrative examples, a method of wireless communication is described. In one configuration, the method may include monitoring, by a first wireless device, at least one predetermined symbol period of a subframe for an indication that a second wireless device has obtained access to a shared radio frequency spectrum; determining a starting symbol for a transmission by the second wireless device over the shared radio frequency spectrum based on detecting the indication; and receiving the transmission by the second wireless device over the shared radio frequency spectrum based on the determined starting symbol. In some cases, the at least one predetermined symbol period may be signaled to the first wireless device by a RRC message.

In some examples, the method may include buffering, prior to determining the starting symbol for the transmission, a signal including at least a portion of the transmission. In some examples, the method may include detecting the indication that the second wireless device has obtained access to the shared radio frequency spectrum in a symbol transmitted after the starting symbol. In some examples of the method, the monitoring may include monitoring a plurality of predetermined symbol periods, and the method may further include detecting the indication that the second wireless device has obtained access to the shared radio frequency spectrum in one of the plurality of predetermined symbol periods. In some examples, the method may include detecting the indication that the second wireless device has obtained access to the shared radio frequency spectrum in one of the at least one predetermined symbol period, and determining the starting symbol may include identifying the starting symbol as a symbol occupying a symbol period in which the indication that the second wireless device has obtained access to the shared radio frequency spectrum is detected.

In some examples, the method may include identifying the at least one predetermined symbol period of the subframe based on a duration of a radio frame including the subframe. In some examples, the method may include determining, based on a symbol period including the starting symbol, at least one of: at least one symbol period to monitor for a reference signal; at least one resource element of the shared radio frequency spectrum to monitor for the reference signal or a control channel; a resource element aggregation level for receiving the transmission by the second wireless device; a transport block scaling for receiving the transmission by the second wireless device; a duration of a channel usage beacon signal (CUBS) transmitted by the second wireless device; a content of the CUBS; or a number of symbols before a next subframe boundary. In some cases, the predetermined symbol period may be signaled to the first device by one or more RRC messages.

In some examples, the method may include determining a mapping of the transmission by the second wireless device to a virtual subframe spanning more than one subframe of a radio frame. In these examples, receiving the transmission by the second wireless device may include receiving the transmission across the more than one subframe of the radio frame. In some examples, the method may include receiving a reference signal as part of the transmission by the second wireless device, and a timing of receiving the reference signal may be determined by a format of a subframe of the radio frame.

In a second set of illustrative examples, an apparatus for wireless communication is described. In one configuration, the apparatus may include means for monitoring, by a first wireless device, at least one predetermined symbol period of a subframe for an indication that a second wireless device has obtained access to a shared radio frequency spectrum; means for determining a starting symbol for a transmission by the second wireless device over the shared radio frequency spectrum based on detecting the indication; and means for receiving the transmission by the second wireless device over the shared radio frequency spectrum based on the determined starting symbol.

In a third set of illustrative examples, another apparatus for wireless communication is described. In one configuration, the apparatus may include a processor, memory in electronic communication with the processor, and instructions stored in the memory. The instructions may be executable by the processor to monitor, by a first wireless device, at least one predetermined symbol period of a subframe for an indication that a second wireless device has obtained access to a shared radio frequency spectrum; determine a starting symbol for a transmission by the second wireless device over the shared radio frequency spectrum based on detecting the indication; and receive the transmission by the second wireless device over the shared radio frequency spectrum based on the determined starting symbol.

In a fourth set of illustrative examples, a computer-readable medium for storing instructions executable by a processor is described. In one configuration, the instructions may include instructions to monitor, by a first wireless device, at least one predetermined symbol period of a subframe for an indication that a second wireless device has obtained access to a shared radio frequency spectrum; instructions to determine a starting symbol for a transmission by the second wireless device over the shared radio frequency spectrum based on detecting the indication; and instructions to receive the transmission by the second wireless device over the shared radio frequency spectrum based on the determined starting symbol. In some cases, the predetermined symbol period may be signaled to the first wireless device by RRC signaling.

In a fifth set of illustrative examples, another method of wireless communication is described. In one configuration, the method may include obtaining access to a shared radio frequency spectrum at a second wireless device; transmitting, to a first wireless device and in a predetermined symbol period of a subframe, an indication that the second wireless device has obtained access to the shared radio frequency spectrum, wherein the indication conveys a symbol period including a starting symbol of a transmission to the first wireless device by the second wireless device; and beginning the transmission to the first wireless device over the shared radio frequency spectrum according to the indicated starting symbol.

In some examples of the method, the transmission to the first wireless device includes a physical downlink control channel (PDCCH), and the method may further include adjusting a transmit power for the PDCCH based on the symbol period including the starting symbol. In some examples, the method may include beginning the transmission to the first wireless device before transmitting the indication that the second wireless device has obtained access to the shared radio frequency spectrum. In some examples of the method, the predetermined symbol period includes the starting symbol of the transmission to the first wireless device. In some examples, the method may include selecting the predetermined symbol period based on a duration of a radio frame including the transmission.

In some examples, the method may include determining, based on the symbol period including the starting symbol, at least one of: at least one symbol period to use for transmitting a reference signal; at least one resource element of the shared radio frequency spectrum to use for transmitting the reference signal or a control channel; a resource element aggregation level for the transmission to the first wireless device; a transport block scaling for the transmission to the first wireless device; a duration of a CUBS for transmission to the first wireless device; a content of the CUBS; or a number of symbols before a next subframe boundary. In some examples, the method may include mapping the transmission to the first wireless device to a virtual subframe spanning more than one subframe of a radio frame. In some examples, the method may include transmitting the virtual subframe to the first wireless device, the virtual subframe including a reference signal having a timing determined by a format of a subframe of the radio frame.

In a sixth set of illustrative examples, another apparatus for wireless communication is described. In one configuration, the apparatus may include means for obtaining access to a shared radio frequency spectrum at a second wireless device; means for transmitting, to a first wireless device and in a predetermined symbol period of a subframe, an indication that the second wireless device has obtained access to the shared radio frequency spectrum, wherein the indication conveys a symbol period including a starting symbol of a transmission to the first wireless device by the second wireless device; and means for beginning the transmission to the first wireless device over the shared radio frequency spectrum according to the indicated starting symbol.

In a seventh set of illustrative examples, another apparatus for wireless communication is described. In one configuration, the apparatus may include a processor, memory in electronic communication with the processor, and instructions stored in the memory. The instructions may be executable by the processor to obtain access to a shared radio frequency spectrum at a second wireless device; transmit, to a first wireless device and in a predetermined symbol period of a subframe, an indication that the second wireless device has obtained access to the shared radio frequency spectrum, wherein the indication conveys a symbol period including a starting symbol of a transmission to the first wireless device by the second wireless device; and begin the transmission to the first wireless device over the shared radio frequency spectrum according to the indicated starting symbol. In some cases, the predetermined symbol period may be signaled to the first device by RRC messages.

In an eighth set of illustrative examples, another computer-readable medium for storing instructions executable by a processor is described. In one configuration, the instructions may include instructions to obtain access to a shared radio frequency spectrum at a second wireless device; instructions to transmit, to a first wireless device and in a predetermined symbol period of a subframe, an indication that the second wireless device has obtained access to the shared radio frequency spectrum, wherein the indication conveys a symbol period including a starting symbol of a transmission to the first wireless device by the second wireless device; and instructions to begin the transmission to the first wireless device over the shared radio frequency spectrum according to the indicated starting symbol. In some cases, the predetermined symbol period may be transmitted to the first wireless device by RRC messages.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
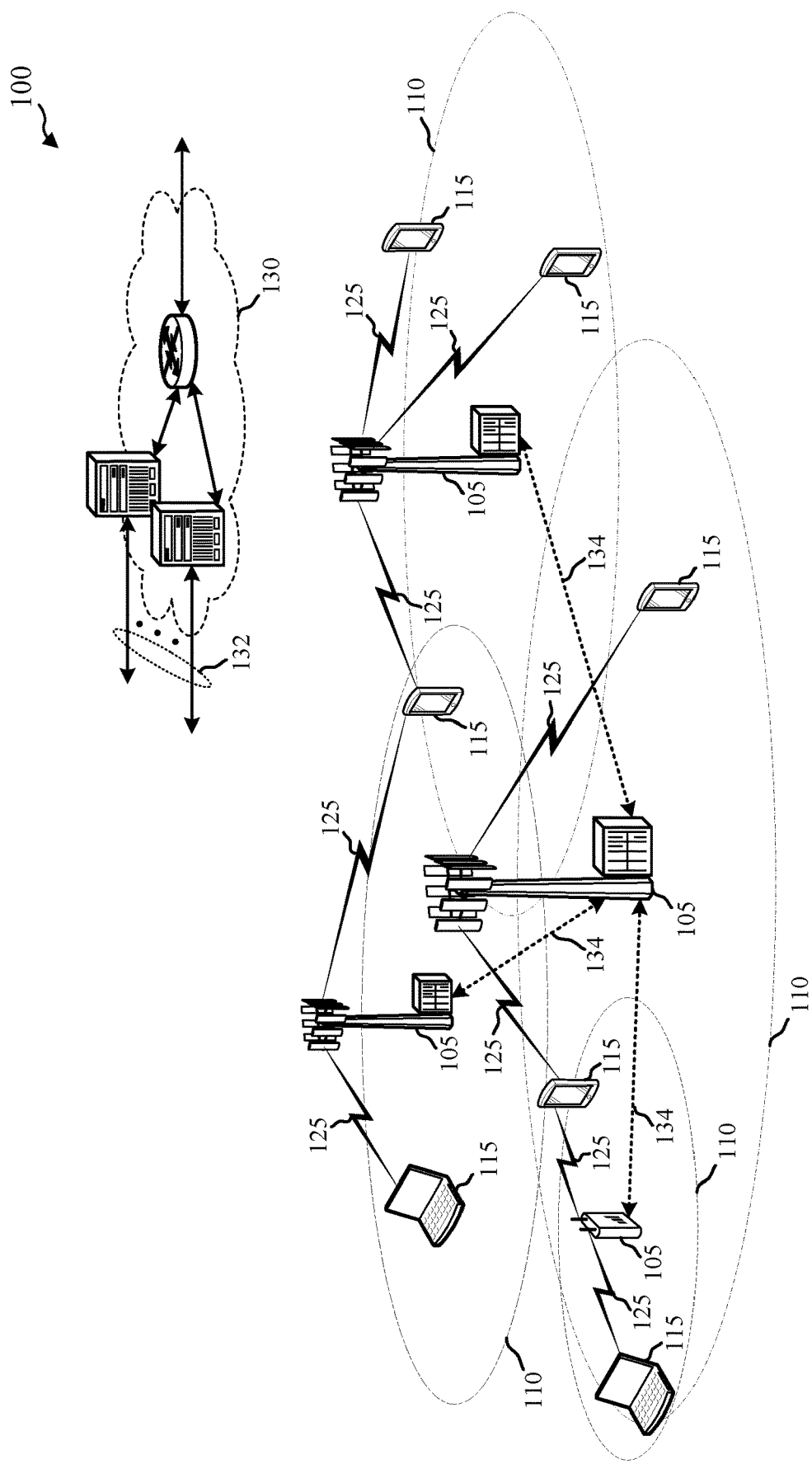
FIG. 1 illustrates an example of a wireless communication system, in accordance with various aspects of the disclosure.

Techniques are described in which a shared radio frequency spectrum is used for at least a portion of communications over a wireless communication system. In some examples, the shared radio frequency spectrum may be used for LTE/LTE-A communications. The shared radio frequency spectrum may be used in combination with, or independent from, a dedicated radio frequency spectrum. The dedicated radio frequency spectrum may be a radio frequency spectrum for which transmitting apparatuses may not contend for access because the radio frequency spectrum is licensed to particular users, such as a licensed radio frequency spectrum usable for LTE/LTE-A communications. The shared radio frequency spectrum may be a radio frequency spectrum for which a device may need to contend for access (e.g., a radio frequency spectrum that is available for unlicensed use, such as Wi-Fi use, or a radio frequency spectrum that is available for use by multiple operators in an equally shared or prioritized manner).

With increasing data traffic in cellular networks that use a dedicated radio frequency spectrum, offloading of at least some data traffic to a shared radio frequency spectrum may provide a cellular operator (e.g., an operator of a public land mobile network (PLMN) or a coordinated set of base stations defining a cellular network, such as an LTE/LTE-A network) with opportunities for enhanced data transmission capacity. Use of a shared radio frequency spectrum may also provide service in areas where access to a dedicated radio frequency spectrum is unavailable. As noted above, before communicating over a shared radio frequency spectrum, transmitting apparatuses may perform an LBT procedure to gain access to the medium. Such an LBT procedure may include performing a CCA procedure (or extended CCA procedure) to determine whether a channel of the shared radio frequency spectrum is available. When it is determined that the channel of the shared radio frequency spectrum is available, a CUBS may be transmitted to reserve the channel. When it is determined that a channel is not available, a CCA procedure (or extended CCA procedure) may be performed for the channel again at a later time.

When it is determined that the channel of the shared radio frequency spectrum is available, the base station or UE may transmit one or more channel reservation signals (e.g., one or more channel usage beacon signals (CUBS)) over the channel, to reserve the channel. In some examples, the channel reservation signal(s) may be transmitted over the channel until a next subframe boundary, at which time a data or control transmission may be made over the channel. In other examples, the channel reservation signal(s) may be transmitted over the channel for a shorter duration or not at all. A data or control transmission may then begin during a symbol period of the subframe in which contention for access to the shared radio frequency spectrum is won. Because it may be inefficient for a receiving apparatus to monitor each symbol period of a subframe for a starting symbol of a data or control transmission, or because it may be undesirable to transmit a starting symbol during certain symbol periods, or for other reasons, it may be useful for a transmitting apparatus to transmit, to a receiving apparatus, an indication that the transmitting apparatus has obtained access to the shared radio frequency spectrum. The indication may be transmitted during a predetermined symbol period of a subframe, or in one of a plurality of predetermined symbol periods of the subframe, and may convey a symbol period including the starting symbol of the data or control transmission.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrums as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions. The downlink transmissions may include, for example, a physical downlink shared channel (PDSCH), a physical downlink control channel (PDCCH; e.g., for transmission over a dedicated radio frequency spectrum), or an enhanced PDCCH (EPDCCH; e.g., for transmission over a shared radio frequency spectrum). The uplink transmissions may include, for example, a physical uplink shared channel (PUSCH) or a physical uplink control channel (PUCCH).

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some examples, the wireless communication system 100 may support operation over a dedicated radio frequency spectrum (e.g., a radio frequency spectrum for which transmitting apparatuses may not contend for access because the radio frequency spectrum is licensed to particular users for particular uses, such as a licensed radio frequency spectrum usable for LTE/LTE-A communications) or a shared radio frequency spectrum (e.g., a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner)).

In some examples, the physical resource blocks (PRBs) which may be used a base station 105 or UE 115 to make a transmission may have 12×14=168 resource elements (REs; e.g., 12 frequency subcarriers multiplied by 14 symbol periods in a subframe) When a base station 105 transmits an EPDCCH over the shared radio frequency spectrum using such PRBs, the EPDCCH may be transmitted on a channel in an interleaved mode (e.g., over non-adjacent and simultaneously transmitted PRBs of the channel), and may occupy a majority of the frequency bandwidth of the channel. The EPDCCH may also span all of the available symbol periods of a subframe. In some examples, an EPDCCH may be transmitted using enhanced resource element groups (EREGs) and enhanced control channel elements (ECCEs). When defining an EREG, resource elements used to transmit a demodulation reference signal (DM-RS) may be excluded, and all other resource elements may be included. In some examples, a maximum presence of DM-RS resource elements may be presumed when defining an EREG (e.g., 24 DM-RS resource elements for a transmission having a normal cyclic prefix (CP), and 16 DM-RS resource elements for a transmission having an extended CP). The number of non-DM-RS resource elements for a transmission having a normal CP may therefore be 12×14−24=144, and the number of non-DM-RS resource elements for a transmission having an extended CP may be 12×12−16=128. In some examples, a PRB may be divided into 16 EREGs, regardless of subframe type, CP type, PRB pair index, subframe index, etc. For example, a PRB may be divided into 8 REs/EREGs for a transmission having a normal CP, and 8 REs/EREGs for a transmission having an extended CP. The EREG to RE mapping may follow a cyclic/sequential and frequency-first-time-second manner, which may be beneficial in equalizing the number of available REs per EREG.

Due to the presence of other signals, the number of REs available for an EPDCCH may not be fixed, and may differ for different EREGs in a PRB pair. In some examples, the number of EREGs per ECCE can be 4 or 8 (e.g., N=4 or 8; where N=4, corresponding to 4 ECCEs per PRB pair, for a transmission having a normal CP and normal subframe length (or special subframe configurations 3, 4, or 8 when the number of REs/PRB pair is large; and where N=8 otherwise, corresponding to 2 ECCEs per PRB pair). An ECCE may be defined according to an EREG grouping, and regardless of a localized or distributed EPDCCH, 4 EREGs may be defined (e.g., Group #0: EREGs {0, 4, 8, 12}; Group #1: EREGs {1, 5, 9, 13}; Group #2: EREGs {2, 6, 10, 14}; and Group #3: EREGs {3, 7, 11, 15}).

Figure 2:
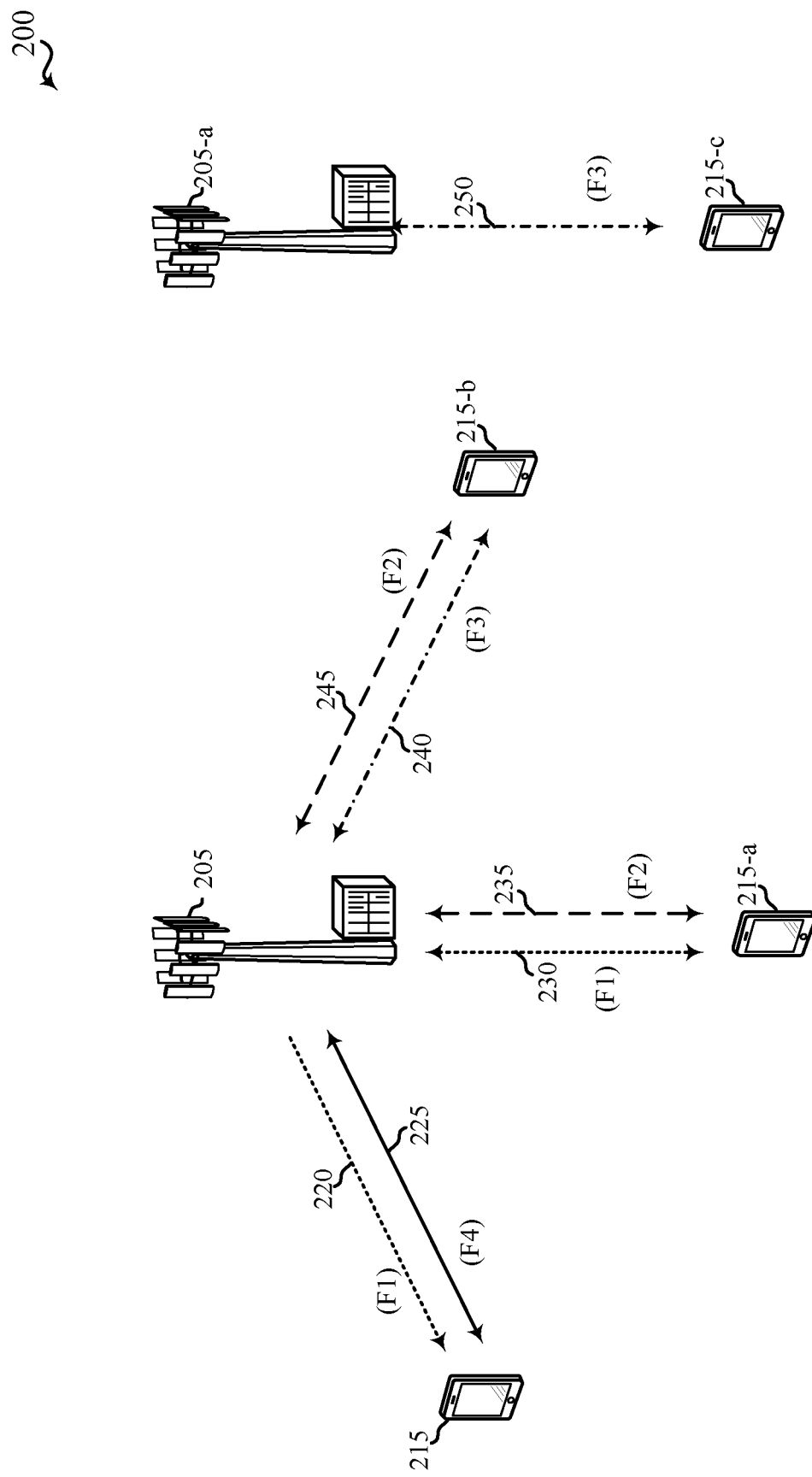
FIG. 2 shows a wireless communication system in which LTE/LTE-A may be deployed under different scenarios using a shared radio frequency spectrum, in accordance with various aspects of the present disclosure.

FIG. 2 shows a wireless communication system 200 in which LTE/LTE-A may be deployed under different scenarios using a shared radio frequency spectrum, in accordance with various aspects of the present disclosure. More specifically, FIG. 2 illustrates examples of a supplemental downlink mode (also referred to as a licensed assisted access mode), a carrier aggregation mode, and a standalone mode in which LTE/LTE-A is deployed using a shared radio frequency spectrum. The wireless communication system 200 may be an example of portions of the wireless communication system 100 described with reference to FIG. 1. Moreover, a first base station 205 and a second base station 205-*a* may be examples of aspects of one or more of the base stations 105 described with reference to FIG. 1, while a first UE 215, a second UE 215-*a*, a third UE 215-*b*, and a fourth UE 215-*c* may be examples of aspects of one or more of the UEs 115 described with reference to FIG. 1.

In the example of a supplemental downlink mode (e.g., a licensed assisted access mode) in the wireless communication system 200, the first base station 205 may transmit OFDMA waveforms to the first UE 215 using a downlink channel 220. The downlink channel 220 may be associated with a frequency F1 in a shared radio frequency spectrum. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a dedicated radio frequency spectrum. The downlink channel 220 in the shared radio frequency spectrum and the first bidirectional link 225 in the dedicated radio frequency spectrum may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a dedicated radio frequency spectrum and needs to relieve some of the traffic or signaling congestion.

In one example of a carrier aggregation mode in the wireless communication system 200, the first base station 205 may transmit OFDMA waveforms to the second UE 215-*a* using a second bidirectional link 230 and may receive OFDMA waveforms, SC-FDMA waveforms, or resource block interleaved FDMA waveforms from the second UE 215-*a* using the second bidirectional link 230. The second bidirectional link 230 may be associated with the frequency F1 in the shared radio frequency spectrum. The first base station 205 may also transmit OFDMA waveforms to the second UE 215-*a* using a third bidirectional link 235 and may receive SC-FDMA waveforms from the second UE 215-*a* using the third bidirectional link 235. The third bidirectional link 235 may be associated with a frequency F2 in a dedicated radio frequency spectrum. The second bidirectional link 230 may provide a downlink and uplink capacity offload for the first base station 205. Like the supplemental downlink (e.g., the licensed assisted access mode) described above, this scenario may occur with any service provider (e.g., MNO) that uses a dedicated radio frequency spectrum and needs to relieve some of the traffic or signaling congestion.

In another example of a carrier aggregation mode in the wireless communication system 200, the first base station 205 may transmit OFDMA waveforms to the third UE 215-*b* using a fourth bidirectional link 240 and may receive OFDMA waveforms, SC-FDMA waveforms, or resource block interleaved waveforms from the third UE 215-*b* using the fourth bidirectional link 240. The fourth bidirectional link 240 may be associated with a frequency F3 in the shared radio frequency spectrum. The first base station 205 may also transmit OFDMA waveforms to the third UE 215-*b* using a fifth bidirectional link 245 and may receive SC-FDMA waveforms from the third UE 215-*b* using the fifth bidirectional link 245. The fifth bidirectional link 245 may be associated with the frequency F2 in the dedicated radio frequency spectrum. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a dedicated radio frequency spectrum and use a shared radio frequency spectrum for capacity offload.

As described above, one type of service provider that may benefit from the capacity offload offered by using LTE/LTE-A in a shared radio frequency spectrum is a traditional MNO having access rights to an LTE/LTE-A dedicated radio frequency spectrum. For these service providers, an operational example may include a bootstrapped mode (e.g., supplemental downlink (e.g., licensed assisted access), carrier aggregation) that uses the LTE/LTE-A primary component carrier (PCC) on the dedicated radio frequency spectrum and at least one secondary component carrier (SCC) on the shared radio frequency spectrum.

In the carrier aggregation mode, data and control may, for example, be communicated in the dedicated radio frequency spectrum (e.g., via first bidirectional link 225, third bidirectional link 235, and fifth bidirectional link 245) while data may, for example, be communicated in the shared radio frequency spectrum (e.g., via second bidirectional link 230 and fourth bidirectional link 240). The carrier aggregation mechanisms supported when using a shared radio frequency spectrum may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-*a* may transmit OFDMA waveforms to the fourth UE 215-*c* using a bidirectional link 250 and may receive OFDMA waveforms, SC-FDMA waveforms, or resource block interleaved FDMA waveforms from the fourth UE 215-*c* using the bidirectional link 250. The bidirectional link 250 may be associated with the frequency F3 in the shared radio frequency spectrum. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a dedicated radio frequency spectrum.

In some examples, a transmitting apparatus such as one of the base stations 105, 205, or 205-*a* described with reference to FIG. 1 or 2, or one of the UEs 115, 215, 215-*a*, 215-*b*, or 215-*c* described with reference to FIG. 1 or 2, may use a gating interval to gain access to a channel of a shared radio frequency spectrum (e.g., to a physical channel of the shared radio frequency spectrum). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a shared radio frequency spectrum is available or in use for the gating interval (also referred to as an LBT radio frame). When a CCA procedure indicates that the channel is available for a corresponding LBT radio frame (e.g., "clear" for use), the transmitting apparatus may reserve or use the channel of the shared radio frequency spectrum during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
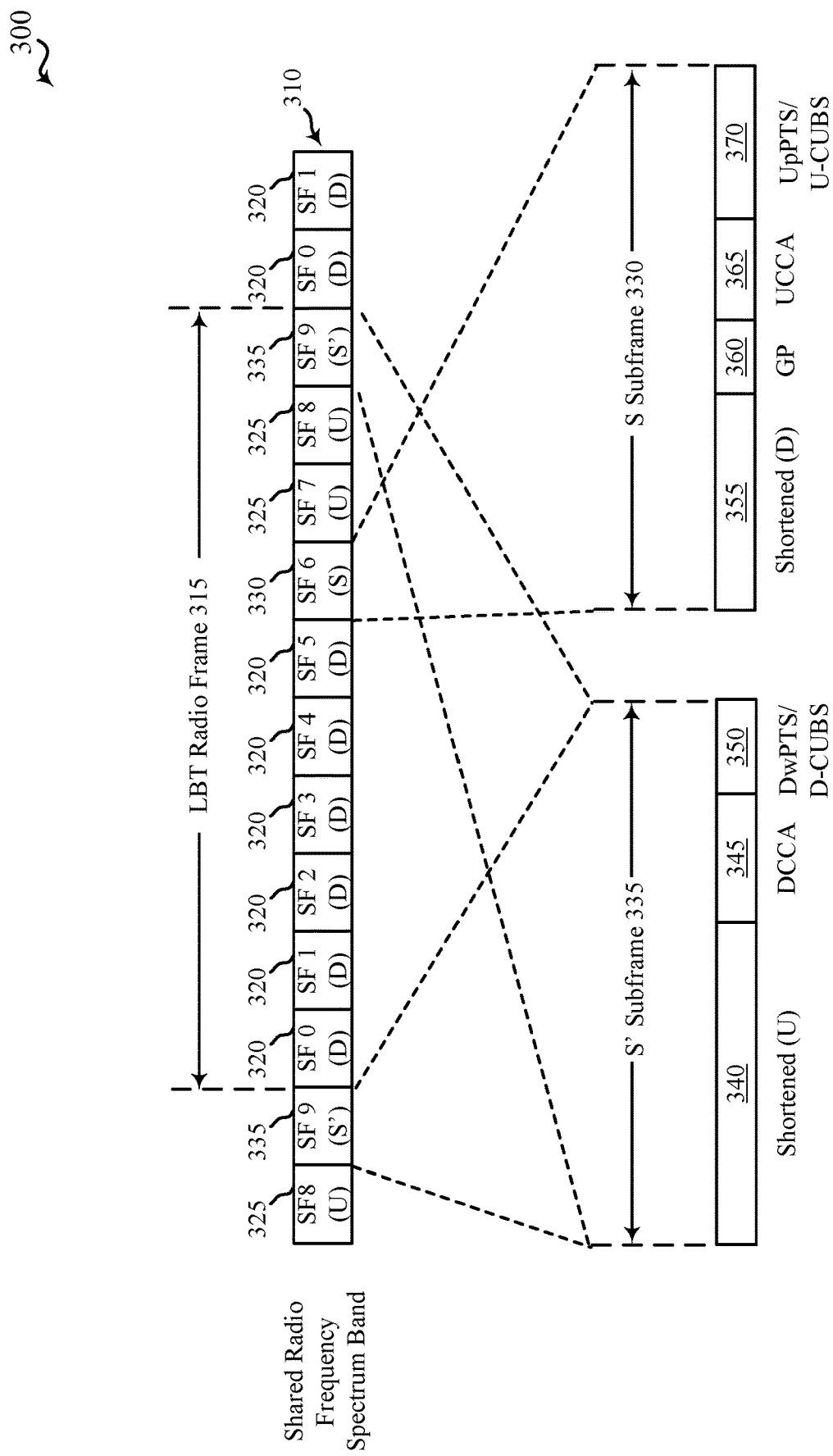
FIG. 3 shows an example of a wireless communication over a shared radio frequency spectrum, in accordance with various aspects of the present disclosure.

FIG. 3 shows an example 300 of a wireless communication 310 over a shared radio frequency spectrum, in accordance with various aspects of the present disclosure. In some examples, the wireless communication 310 may include one or more component carriers, which component carrier(s) may be transmitted, for example, as part of a transmission made according to the supplemental downlink mode (e.g., the licensed assisted access mode), the carrier aggregation mode, or the standalone mode described with reference to FIG. 2.

In some examples, an LBT radio frame 315 of the wireless communication 310 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

During the S' subframe 335, a downlink clear channel assessment (DCCA) procedure 345 may be performed by one or more base stations, such as one or more of the base stations 105, 205, or 205-*a* described with reference to FIG. 1 or 2, to reserve, for a period of time, a channel of the shared radio frequency spectrum over which the wireless communication 310 occurs. Following a successful DCCA procedure 345 by a base station, the base station may transmit a channel usage beacon signal (CUBS) (e.g., a downlink CUBS (D-CUBS 350)) to provide an indication to other base stations or apparatuses (e.g., UEs, Wi-Fi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least a certain percentage of the available frequency bandwidth of the shared radio frequency spectrum and satisfy one or more regulatory requirements (e.g., a requirement that transmissions over the shared radio frequency spectrum occupy at least 80% of the available frequency bandwidth). The D-CUBS 350 may in some examples take a form similar to that of an LTE/LTE-A cell-specific reference signal (CRS) or a channel state information reference signal (CSI-RS). When the DCCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened uplink (U) period. A second portion of the S' subframe 335 may be used for the DCCA procedure 345. A third portion of the S' subframe 335 may be used by one or more base stations that successfully contend for access to the channel of the shared radio frequency spectrum as a downlink pilot time slot (DwPTS) or to transmit the D-CUBS 350. For transmissions having a normal CP, possible DwPTS lengths include {3, 6, 9, 10, 11, 12} symbol periods. For transmissions having an extended CP, possible DwPTS lengths include {3, 5, 8, 9, 10} symbol periods.

During the S subframe 330, an uplink CCA (UCCA) procedure 365 may be performed by one or more UEs, such as one or more of the UEs 115, 215, 215-*a*, 215-*b*, or 215-*c* described above with reference to FIG. 1 or 2, to reserve, for a period of time, the channel over which the wireless communication 310 occurs. Following a successful UCCA procedure 365 by a UE, the UE may transmit an uplink CUBS (U-CUBS 370) to provide an indication to other UEs or apparatuses (e.g., base stations, Wi-Fi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least a certain percentage of the available frequency bandwidth of the shared radio frequency spectrum and satisfy one or more regulatory requirements (e.g., the requirement that transmissions over the shared radio frequency spectrum occupy at least 80% of the available frequency bandwidth). The U-CUBS 370 may in some examples take a form similar to that of an LTE/LTE-A CRS or CSI-RS. When the UCCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the UCCA procedure 365. A fourth portion of the S subframe 330 may be used by one or more UEs that successfully contend for access to the channel of the shared radio frequency spectrum as an uplink pilot time slot (UpPTS) or to transmit the U-CUBS 370. For transmissions having a normal CP or an extended CP, possible UpPTS lengths include 1 or 2 symbol periods.

The transport block size (TBS) for the shortened D period 355 may be scaled downward by a factor. For example, the TBS scaling factor may be 0.375 for a DwPTS length of 6 (e.g., a transmission having a normal CP) or 5 (e.g., a transmission having an extended CP). If the DwPTS length is 3, a PDSCH or EPDCCH may not be transmitted. The TBS scaling factor may be 0.75 for other special subframe configurations.

In some examples, the DCCA procedure 345 or the UCCA procedure 365 may include the performance of a single CCA procedure. In other examples, the DCCA procedure 345 or the UCCA procedure 365 may include the performance of an extended CCA procedure. The extended CCA procedure may include a random number of CCA procedures, and in some examples may include a plurality of CCA procedures. The terms DCCA procedure and UCCA procedure are therefore intended to be broad enough to cover the performance of either a single CCA procedure or an extended CCA procedure. The selection of a single CCA procedure or an extended CCA procedure, for performance by a base station or a UE during an LBT radio frame, may be based on LBT rules. In some cases, the term CCA procedure may be used in this disclosure, in a general sense, to refer to either a single CCA procedure or an extended CCA procedure.

By way of example, the LBT radio frame 315 has a DDDDDDSUUS' TDD frame structure. In other examples, an LBT radio frame may have a different TDD frame structure. For example, an LBT radio frame may have one of the TDD frame structures used in enhanced interference mitigation and traffic adaptation (eIMTA).

Figure 4A:
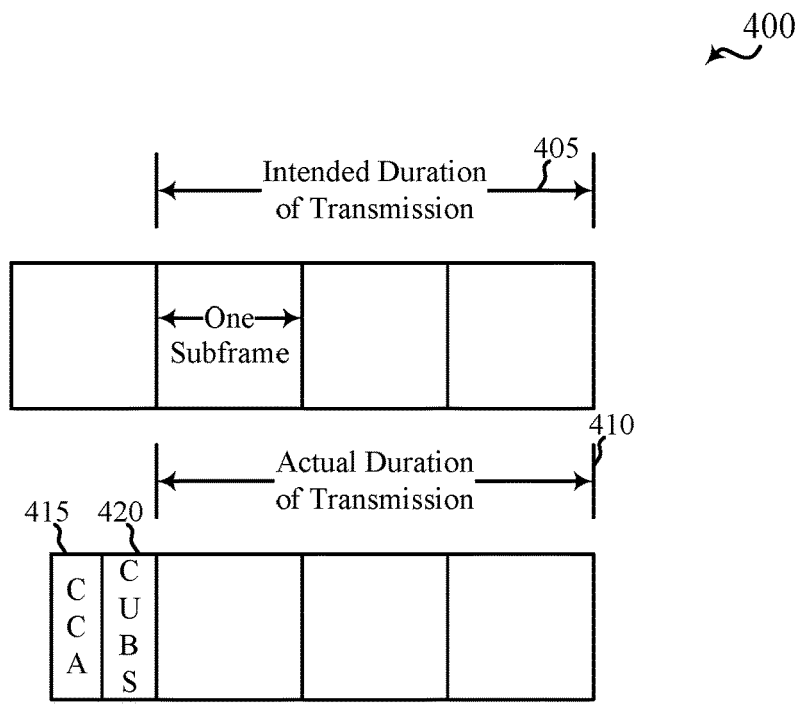
FIG. 4A shows an example of a CCA procedure performed by a transmitting apparatus when contending for access to an unlicensed radio frequency spectrum band, in accordance with various aspects of the present disclosure.

FIG. 4A shows an example 400 of a CCA procedure 415 performed by a transmitting apparatus when contending for access to an unlicensed radio frequency spectrum band, in accordance with various aspects of the present disclosure. In some examples, the CCA procedure 415 may be an example of the DCCA procedure 345 or UCCA procedure 365 described with reference to FIG. 3. The CCA procedure 415 may have a fixed duration. In some examples, the CCA procedure 415 may be performed in accordance with an LBT-frame based equipment (LBT-FBE) protocol (e.g., the LBT-FBE protocol described by EN 301 893). Following the CCA procedure 415, a CUBS 420 may be transmitted, followed by a data transmission (e.g., an uplink transmission or a downlink transmission). By way of example, the data transmission may have an intended duration 405 of three subframes and an actual duration 410 of three subframes.

Figure 4B:
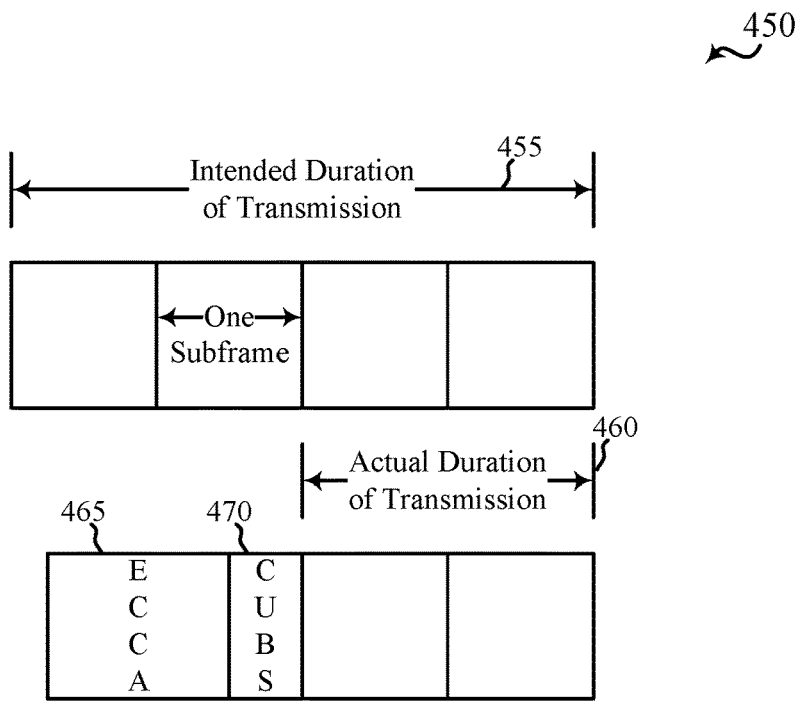
FIG. 4B shows an example of an extended CCA (ECCA) procedure performed by a transmitting apparatus when contending for access to an unlicensed radio frequency spectrum band, in accordance with various aspects of the present disclosure.

FIG. 4B shows an example 450 of an extended CCA (ECCA) procedure 465 performed by a transmitting apparatus when contending for access to an unlicensed radio frequency spectrum band, in accordance with various aspects of the present disclosure. In some examples, the ECCA procedure 465 may be an example of the DCCA procedure 345 or UCCA procedure 365 described with reference to FIG. 3. The ECCA procedure 465 may include a random number of CCA procedures, and in some examples may include a plurality of CCA procedures. The ECCA procedure 465 may therefore have a variable duration. In some examples, the ECCA procedure 465 may be performed in accordance with an LBT-load based equipment (LBT-LBE) protocol (e.g., the LBT-LBE protocol described by EN 301 893). The ECCA procedure 465 may provide a greater likelihood of winning contention to access the unlicensed radio frequency spectrum band, but at a potential cost of a shorter data transmission. Following the ECCA procedure 465, a CUBS 470 may be transmitted, followed by a data transmission. By way of example, the data transmission may have an intended duration 455 of three subframes and an actual duration 460 of two subframes.

Figure 5:
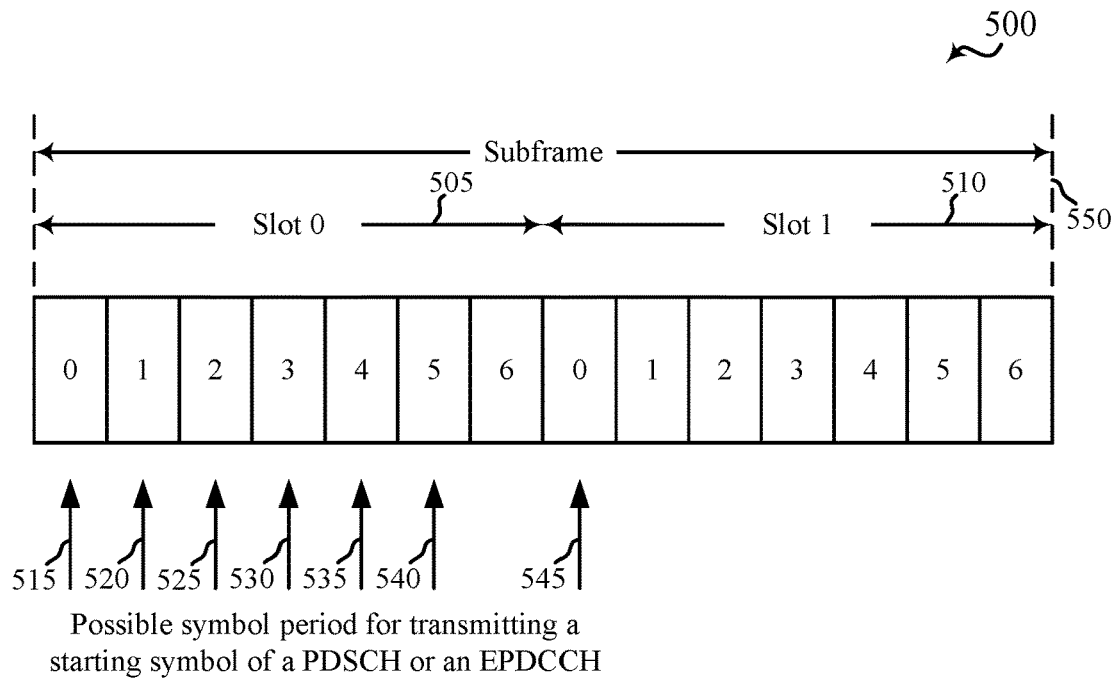
FIG. 5 shows exemplary symbol periods in which a starting symbol of a downlink transmission (e.g., a PDSCH or an EPDCCH) may be transmitted or received during a subframe, in accordance with various aspects of the present disclosure.

In some examples, a starting symbol of a transmission made after winning contention for access to a shared radio frequency spectrum may always be transmitted during a first symbol period of a next full subframe, and one or more channel reservation signals (e.g., CUBS or fractional CUBS) may be transmitted until the subframe boundary preceding the next full subframe. In other examples, a starting symbol of a transmission made after winning contention for access to the shared radio frequency spectrum may be transmitted during an earlier symbol period (e.g., a symbol period of the subframe in which contention for access to the shared radio frequency spectrum is won), which may increase transmission efficiency FIG. 5 shows exemplary symbol periods in which a starting symbol of a downlink transmission (e.g., a PDSCH or an EPDCCH) may be transmitted or received during a subframe 500, in accordance with various aspects of the present disclosure. In some examples, the subframe 500 may be transmitted by one or more of the base stations 105, 205, or 205-a described with reference to FIG. 1 or 2, or received by one or more of the UEs 115, 215, 215-a, 215-b, or 215-c described with reference to FIG. 1 or 2. In some examples, the subframe 500 may include a first slot 505 (e.g., Slot 0) and a second slot 510 (e.g., Slot 1), with each slot including seven symbol periods numbered 0, 1, 2, 3, 4, 5, and 6.

In the example shown, the total number of symbol periods in which the starting symbol of the PDSCH or the EPDCCH may be transmitted may be similar to the number of possible DwPTS lengths for an LTE/LTE-A TDD subframe. By way of example, seven symbol periods (e.g., a first symbol period 515, a second symbol period 520, a third symbol period 525, a fourth symbol period 530, a fifth symbol period 535, a sixth symbol period 540, and a seventh symbol period 545) in which the starting symbol of the PDSCH or the EPDCCH may be transmitted are shown. The seven symbol periods in which the starting symbol may be transmitted include symbol periods 0, 1, 2, 3, 4, and 5 of Slot 0 (e.g., for a transmission with normal CP {0, 1, 2, 3, 4, 5} of Slot 0) and symbol period 0 of Slot 1 (e.g., for a transmission with normal CP {0} of Slot 1). Assuming a DM-RS code division multiplexing (CDM) pair in symbol periods 5 and 6 of Slot 0, the starting symbol should not be transmitted during symbol period 6 of Slot 0, so as to not break the time-domain CDM pairing of the DM-RS symbol periods. If the transmission of D-CUBS is mandatory, this implies that the D-CUBS should not be transmitted during symbol period 5 of Slot 0, to avoid starting a transmission of the PDSCH or the EPDCCH during symbol period 6 of Slot 0.

In the example of FIG. 5, it may also be useful to not transmit the starting symbol for a PDSCH or an EPDCCH too late in the subframe 500. In other words, a PDSCH or an EPDCCH should not be transmitted in the subframe 500 unless a reasonable number of resources for the transmission are still available in the subframe 500. In this regard, it would be preferable to transmit the starting symbol during a symbol period of the first slot 505. However, by way of example, FIG. 5 shows symbol period 0 of the second slot 510 as a possible symbol period for transmitting the starting symbol (but not symbol periods 1, 2, 3, 4, 5, or 6 of the second slot 510, because of the smaller number of resources available for transmission of the PDSCH or the EPDCCH before the next subframe boundary 550. In some examples, symbol period 1 of the second slot 510 may also be considered for transmitting a starting symbol, since this would allow for a 4-symbol transmission in the second slot 510 and a 4-symbol PDSCH or EPDCCH transmission is provided for in a special subframe such as the S' subframe described with reference to FIG. 3 (e.g., under a DwPTS length of six symbol periods, of which two are for a legacy control region).

Figure 6:
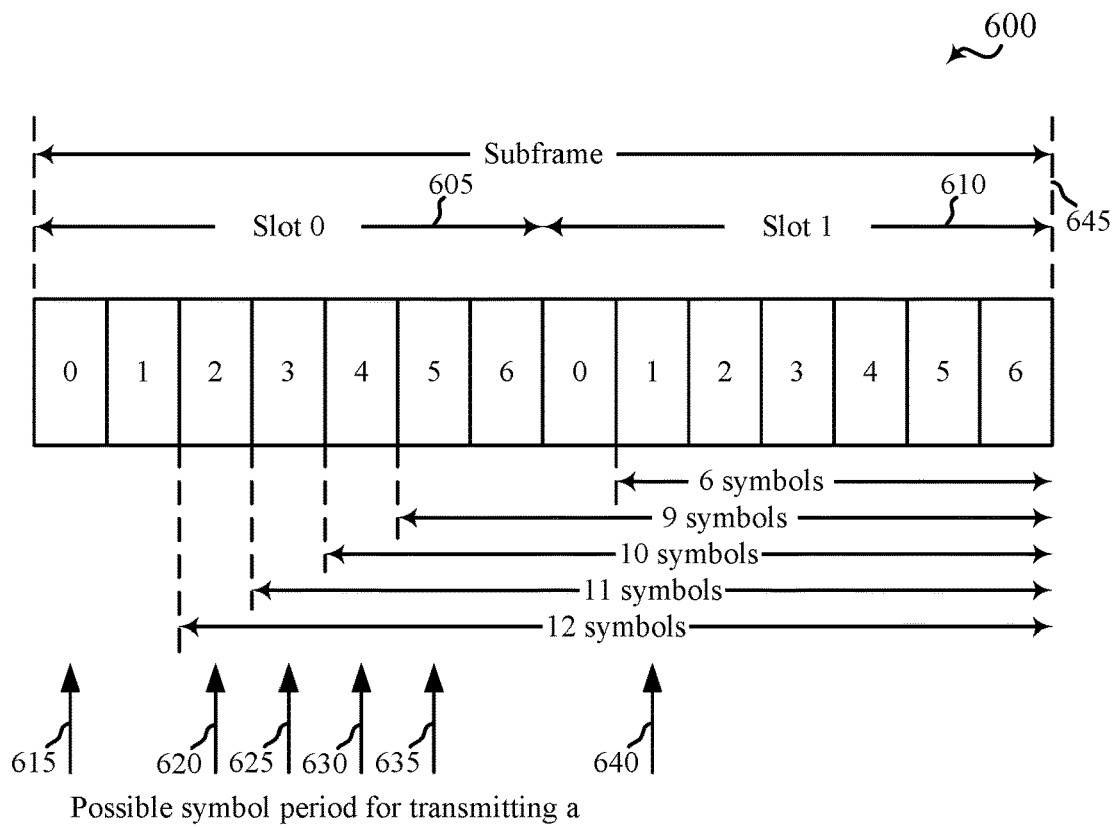
FIG. 6 shows exemplary symbol periods in which a starting symbol of a downlink transmission (e.g., a PDSCH or an EPDCCH) may be transmitted or received during a subframe, in accordance with various aspects of the present disclosure.

FIG. 6 shows exemplary symbol periods in which a starting symbol of a downlink transmission (e.g., a PDSCH or an EPDCCH) may be transmitted or received during a subframe 600, in accordance with various aspects of the present disclosure. In some examples, the subframe 600 may be transmitted by one or more of the base stations 105, 205, or 205-*a* described with reference to FIG. 1 or 2, or received by one or more of the UEs 115, 215, 215-*a*, 215-*b*, or 215-*c* described with reference to FIG. 1 or 2. In some examples, the subframe 600 may include a first slot 605 (e.g., Slot 0) and a second slot 610 (e.g., Slot 1), with each slot including seven symbol periods numbered 0, 1, 2, 3, 4, 5, and 6.

In the example shown, the total number of symbol periods in which the starting symbol of the PDSCH or the EPDCCH may be transmitted may be similar to the number of possible DwPTS lengths for an LTE/LTE-A TDD subframe. By way of example, six symbol periods (e.g., a first symbol period 615, a second symbol period 620, a third symbol period 625, a fourth symbol period 630, a fifth symbol period 635, and a sixth symbol period 640) in which the starting symbol of the PDSCH or the EPDCCH may be transmitted are shown. The six symbol periods in which the starting symbol may be transmitted include symbol periods 0, 2, 3, 4, and 5 of Slot 0, and symbol period 0 of Slot 1. The symbol periods in which the starting symbol may be transmitted are defined such that the remaining subframe duration for a transmission beginning at each starting symbol mimics an LTE/LTE-A DwPTS length (e.g., {6, 9, 10, 11, or 12 symbols}), but for a transmission beginning with a starting symbol transmitted during symbol period 0 of Slot 0. Because DwPTS lengths include a 2-symbol period control region, and a transmission made during a partial subframe may not have a control region, the number of symbols transmitted following one of the starting symbols corresponding to the DwPTS length of {6, 9, 10, 11, or 12 symbols} may in fact be {4, 7, 8, 9, or 10 symbols}.

In some examples, a DM-RS pattern other than an LTE/LTE-A DM-RS pattern may be developed for transmission in a shared radio frequency spectrum, or a DM-RS pattern may be determined based on the symbol period in which the starting symbol of a transmission is transmitted. In these examples, the starting symbol period may be transmitted in additional or different symbol periods (e.g., additional or different symbol periods with respect to the symbol periods identified for transmitting a starting symbol in FIG. 5 or 6). However, the symbol period in which the starting symbol is transmitted may still be selected so as to not break the time-domain CDM pairing of multiple DM-RS symbol periods.

In each of FIGS. 5 and 6, a transmission of D-CUBS may or may not be transmitted, depending on the symbol period in which contention for access to the shared radio frequency spectrum is won. For example, when the starting symbol of a transmission may be transmitted in any symbol period of Slot 0 except symbol period 6, as shown in FIG. 5, a transmission of D-CUBS may not be necessary when contention for access to the shared radio frequency spectrum is won during symbol period 6 of Slot 1, or in symbol period 0, 1, 2, 3, or 4 of Slot 0. Otherwise, a transmission of D-CUBS may be needed. Alternatively, D-CUBS may be transmitted regardless of the symbol period in which a starting symbol is transmitted. However, when D-CUBS is transmitted during a separate symbol period, and a DM-RS is transmitted during symbol periods 5 and 6 of Slot 0, winning contention for access to the shared radio frequency spectrum during symbol period 5 of Slot 0, D-CUBS may be transmitted during symbol periods 5 and 6 of Slot 0, so that a starting symbol of a PDSCH or EPDCCH may be transmitted during symbol period 0 of Slot 1 (instead of during symbol period 6 of Slot 0, which would break the CDM property of the DM-RS).

When the starting symbol of a transmission may be transmitted during different symbol periods, depending on when a base station wins contention for access to a shared radio frequency spectrum, the base station may transmit, to a UE, an indication that the base station has won access to the shared radio frequency spectrum. The indication may also convey the symbol period that includes the starting symbol of a transmission to the UE. The indication may be transmitted, for example, as part of a D-CUBS or in a control channel. In some examples, the indication may be transmitted in one of a number of predetermined symbol periods of a subframe. For example, the indication may be transmitted in one of symbol period 4 of Slot 0 or symbol period 4 of Slot 1 in FIG. 5 or 6 (e.g., in a symbol period containing an LTE/LTE-A cell-specific reference signal (CRS) for a normal CP transmission). When the indication is transmitted in a D-CUBS, the indication may simplify the UE's detection of the D-CUBS. When the indication is transmitted in a control channel, the indication may be transmitted in a dedicated control channel or may be combined with other transmissions in a shared control channel (e.g., the indication may be combined with an indication of a DL/UL configuration for a subframe).

A UE may monitor the at least one predetermined symbol period in which the indication that the base station has won access to the shared radio frequency spectrum may be transmitted. In some cases, the predetermined signal period may be signaled to the UE by RRC signaling. In some examples, the indication may be transmitted after a starting symbol of a transmission to the UE. Given this possibility, the UE may buffer a signal including at least a portion of the transmission, and upon detecting the indication and determining the starting symbol of the transmission, the UE may process at least a portion of the buffered signal. When the indication is transmitted before or at the beginning of a transmission, the indication may be considered "causal" signaling, because it may cause the UE to begin processing a received transmission. When the indication is transmitted after the starting symbol of a transmission, the indication may be considered "non-causal" signaling, because the UE may have already received and buffered part of the transmission. In some examples, the UE may buffer a signal containing a transmission similarly to how the UE may buffer a received LTE/LTE-A control region.

In some examples, the predetermined symbol period(s) in which a starting symbol of a transmission may be transmitted may be frame structure dependent. For example, if a frame has a duration of 4 ms, the symbol periods of a subframe in which a starting symbol may be transmitted may be allocated with finer granularity than for a subframe of a frame having a duration of 10 ms. By way of further example, and for a 4 ms frame structure, the indication that conveys the symbol period including the starting symbol may include three bits, to indicate one of eight different symbol periods in which a starting symbol may be transmitted during a subframe; however, for a 10 ms frame structure, the symbol periods in which a starting symbol may be transmitted may be the first symbol period of each slot of a subframe (e.g., symbol period 0 of Slot 0 and symbol period 0 of Slot 1 in FIG. 5 or 6). In some examples, the indication transmitted in a predetermined symbol period that is frame structure dependent may be a causal signal and include the starting symbol of a transmission (e.g., the indication may be included in a D-CUBS or physical frame format indicator channel (PFFICH)). In some cases, the predetermined symbol period may be signaled to the UE by RRC signaling.

Figure 7:
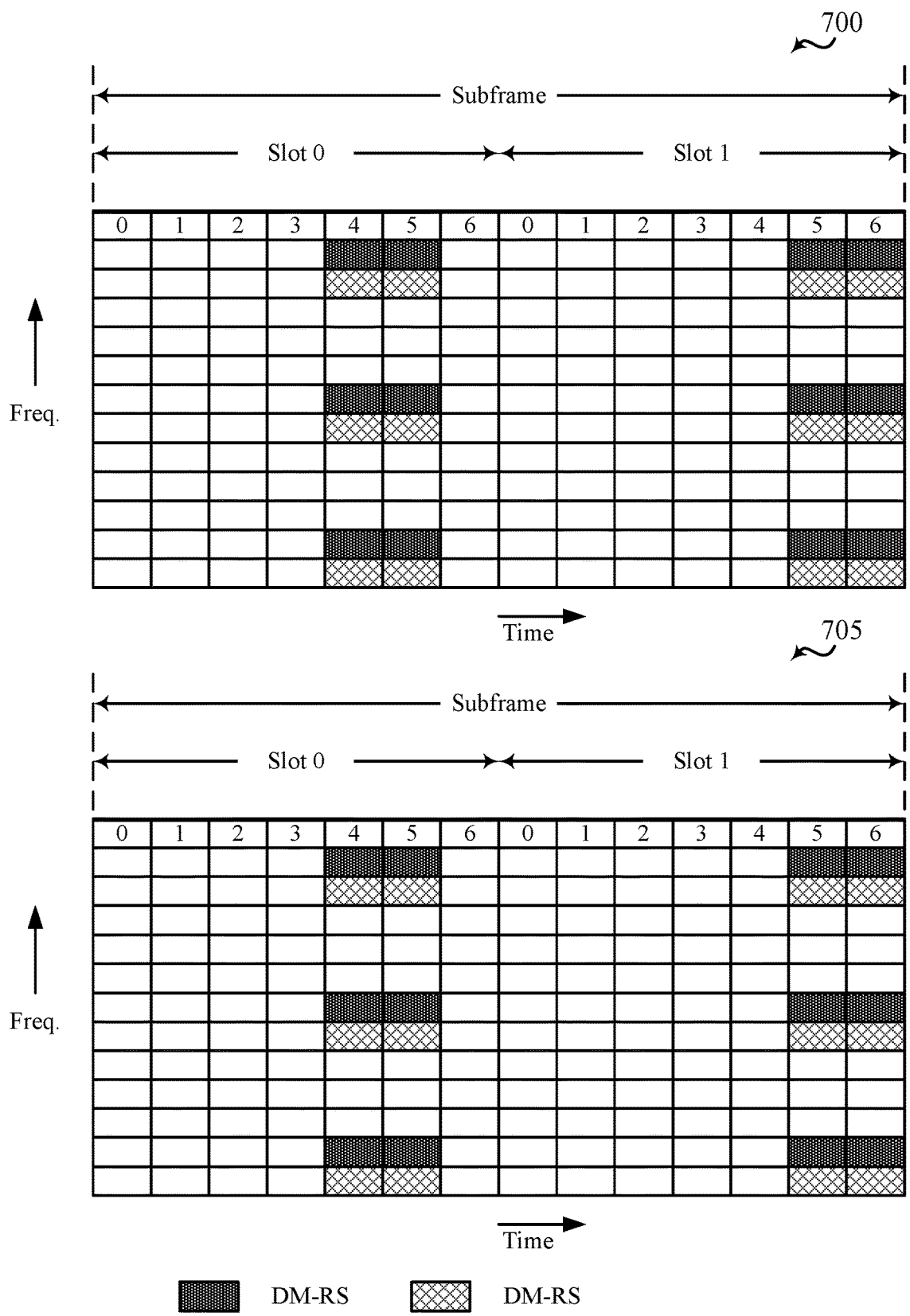
FIG. 7 shows exemplary symbol periods in which a DM-RS may be transmitted or received during a first subframe or a second subframe, in accordance with various aspects of the present disclosure.

FIG. 7 shows exemplary symbol periods in which a DM-RS may be transmitted or received during a first subframe 700 or a second subframe 705, in accordance with various aspects of the present disclosure. In some examples, the first subframe 700 or second subframe 705 may be transmitted by one or more of the base stations 105, 205, or 205-*a* described with reference to FIG. 1 or 2, or received by one or more of the UEs 115, 215, 215-*a*, 215-*b*, or 215-*c* described with reference to FIG. 1 or 2. In some examples, each of the first subframe 700 and the second subframe 705 may include a first slot (e.g., a Slot 0) and a second slot (e.g., a Slot 1), and each slot may include seven symbol periods numbered 0, 1, 2, 3, 4, 5, and 6.

In some examples, the transmission of a DM-RS may depend on the symbol period in which a starting symbol of a transmission is transmitted. For example, when the starting symbol is transmitted during one of symbol periods 0, 1, 2, 7003, 4, 5, or 6 of a first slot (e.g., Slot 0) of a subframe, as presumed in the first subframe 700, a DM-RS may be transmitted during each slot of the subframe (e.g., during symbol periods 5 and 6 of Slot 0, and during symbol periods 5 and 6 of Slot 1, of the first subframe 700). When the starting symbol is transmitted during symbol period 0 of a second slot (e.g., Slot 1) of a subframe, as presumed with the second subframe 705, a DM-RS may be transmitted during the second slot of the subframe (e.g., during symbol periods 5 and 6 of Slot 1 of the second subframe 705). In some examples, a DM-RS may also be transmitted during symbol periods 0 and 1 of Slot 1 of the second subframe 705.

In some examples, the symbol period in which a starting symbol of a transmission is transmitted may determine factors such as a resource element aggregation level for the transmission or a transport block scaling for the transmission (e.g., because the symbol period in which the starting symbol is transmitted determines, at least in part, the number of symbol periods in a subframe that are available for making the transmission). For example, an EPDCCH ECCE definition (e.g., number of EREGs/ECCE) or EPDCCH resource element aggregation level may be determined based on the symbol period in which a starting symbol is transmitted. When the number of available symbol periods in a subframe is small (e.g., less than 10 or another threshold), 8 EREGs/ECCE may be used for transmission of an EPDCCH, or the aggregation level of the transmission may be increased. Also or alternatively, a larger number of resource blocks may be used for transmission of an EPDCCH when the number of available symbol periods in a subframe is small. When transmitting a PDSCH, transport block scaling for the PDSCH may be performed based on the symbol period in which the starting symbol for the PDSCH is transmitted. In some examples, standardized LTE/LTE-A scaling factors may be used (e.g., 0.75 and 0.375).

Figure 8:
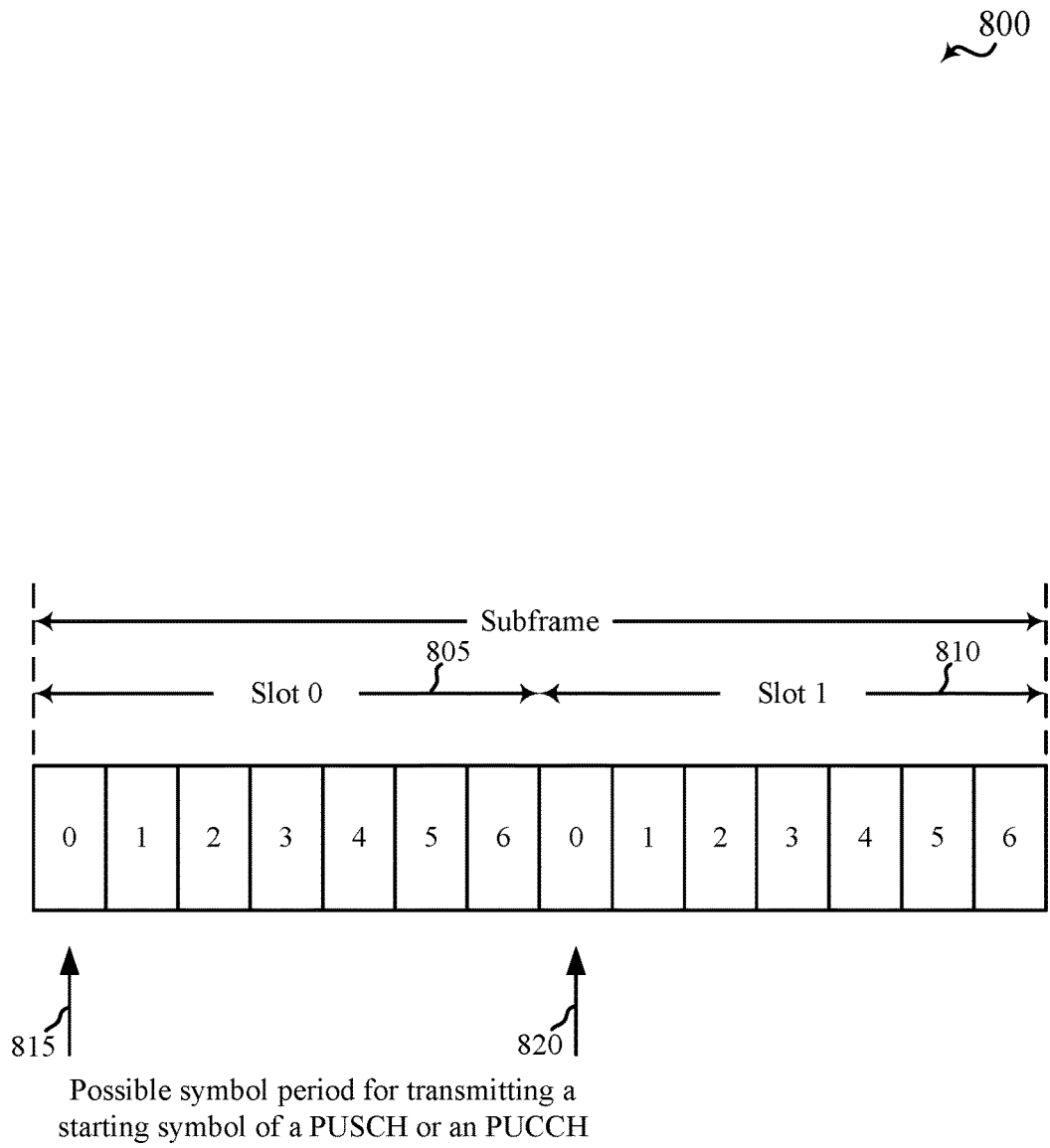
FIG. 8 shows exemplary symbol periods in which a starting symbol of an uplink transmission (e.g., a PUSCH or a PUCCH) may be transmitted or received during a subframe 800, in accordance with various aspects of the present disclosure.

FIG. 8 shows exemplary symbol periods in which a starting symbol of an uplink transmission (e.g., a PUSCH or a PUCCH) may be transmitted or received during a subframe 800, in accordance with various aspects of the present disclosure. In some examples, the subframe 800 may be transmitted by one or more of the UEs 115, 215, 215-*a*, 215-*b*, or 215-*c* described with reference to FIG. 1 or 2, or received by one or more of the base stations 105, 205, or 205-*a* described with reference to FIG. 1 or 2. In some examples, the subframe 800 may include a first slot 805 (e.g., Slot 0) and a second slot 810 (e.g., Slot 1), with each slot including seven symbol periods numbered 0, 1, 2, 3, 4, 5, and 6.

In some examples, the symbol periods in which a starting symbol may be transmitted are the first symbol periods of each slot (e.g., a first symbol period 815 and a second symbol period 820).

When transmitting a PUCCH during the subframe 800, the PUCCH may occupy one or both slots of the subframe 800, with the symbol periods that the PUCCH occupies depending, at least partly, on the symbol period in which a starting symbol is transmitted. When the PUCCH is transmitted in one slot, the transmit power of the PUCCH may be increased (e.g., increased by 3 dB).

When transmitting a PUSCH during the subframe 800, transport block scaling for the PUSCH may be depend on the symbol period in which a starting symbol is transmitted. Transmit power control may also depend on the symbol period in which a starting symbol is transmitted (e.g., when a starting symbol is transmitted during Slot 1 of the subframe 800, power may be increased by 3 dB).

Figure 9:
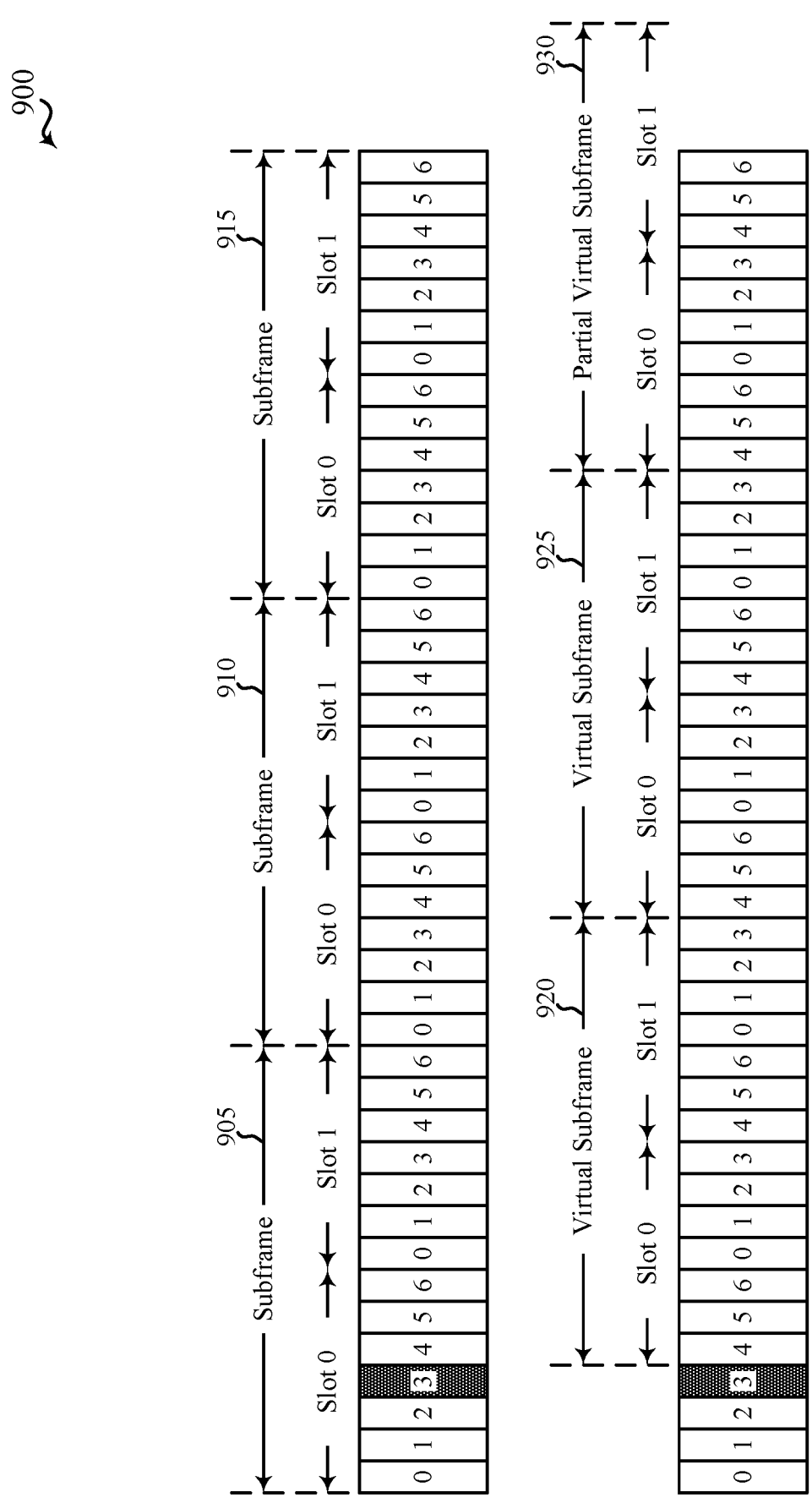
FIG. 9 shows an example mapping of a transmission to one or more virtual subframes, in accordance with various aspects of the present disclosure.

FIG. 9 shows an example mapping 900 of a transmission to one or more virtual subframes, in accordance with various aspects of the present disclosure. In some examples, the one or more virtual subframes may be transmitted by one or more of the base stations 105, 205, or 205-*a* described with reference to FIG. 1 or 2, or received by one or more of the UEs 115, 215, 215-*a*, 215-*b*, or 215-*c* described with reference to FIG. 1 or 2.

By way of example, FIG. 9 shows three subframes (e.g., a first subframe 905, a second subframe 910, and a third subframe 915) of a radio frame. Each subframe includes two slots (e.g., a Slot 0 and a Slot 1), with each slot including seven symbol periods numbered 0, 1, 2, 3, 4, 5, and 6. By way of further example, FIG. 9 presumes that contention for access to a shared radio frequency spectrum is won by a base station in symbol period 3 of Slot 0 of the first subframe 905, and that a transmission to a UE (e.g., a PDSCH or an EPDCCH) begins in symbol period 4 of Slot 0 of the first subframe 905.

In some examples, the transmission to the UE may be mapped to a portion of the first subframe 905 (e.g., a partial first subframe 905), the second subframe 910, and the third subframe 915. In other examples, the transmission to the UE may be mapped to a number of virtual subframes (e.g., a first virtual subframe 920, a second virtual subframe 925, and a partial third virtual subframe 930). The virtual subframes may be aligned to the subframe boundary 920 occurring before the symbol period 3 of Slot 0 of the first subframe 905. Each full virtual subframe (e.g., the first virtual subframe 920 and the second virtual subframe 925) may span more than one subframe (e.g., more than of the first subframe 905, the second subframe 910, or the third subframe 915) of a radio frame.

When a transmission such as a PDSCH or an EPDCCH is mapped to a number of virtual subframes, a reference signal (or signals) transmitted during one or more of the virtual subframes may have a timing determined by a format of a subframe (e.g., the first subframe 905, the second subframe 910, or the third subframe 915) of the radio frame. For example, despite the offset timing of the virtual subframes with respect to the subframes of the radio frame, one or more reference signals (e.g., a CRS) may be transmitted during symbol periods selected as if a transmission was being made according to the subframe timing of the first subframe 905, the second subframe 910, and the third subframe 915. Other reference signals (e.g., a DM-RS) may be transmitted based on a timing of the virtual subframes (e.g., the first virtual subframe 920, the second virtual subframe 925, or the partial third virtual subframe 930).

In some examples, the virtual subframe mapping described with reference to FIG. 9 may just be used with the standalone mode described with reference to FIG. 2, because of the difference in timing between the subframes of the radio frame and the virtual subframes.

Figure 10:
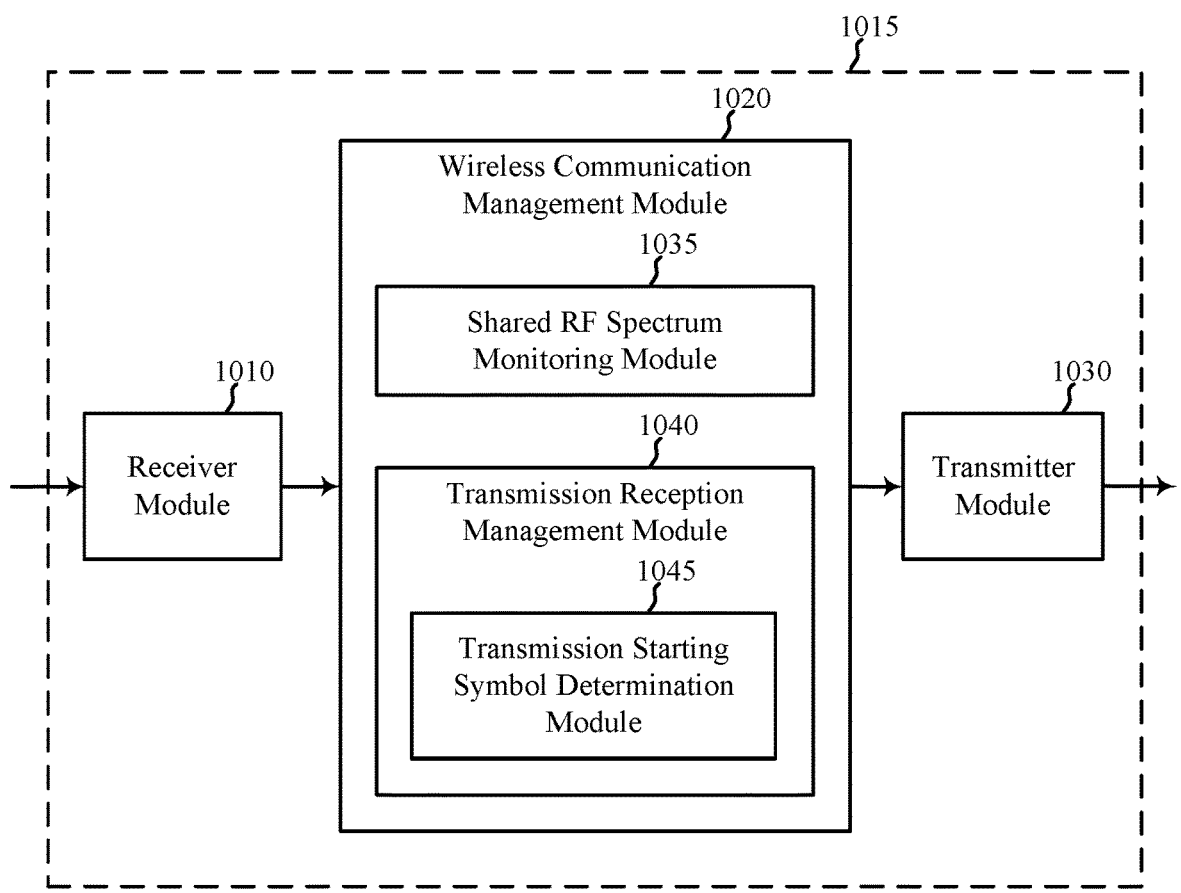
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. The apparatus 1015 may be an example of aspects of one or more of the UEs 115, 215, 215-*a*, 215-*b*, or 215-*c* described with reference to FIG. 1 or 2. The apparatus 1015 may also be or include a processor. The apparatus 1015 may include a receiver module 1010, a wireless communication management module 1020, or a transmitter module 1030. Each of these modules may be in communication with each other.

The modules of the apparatus 1015 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1010 may include at least one radio frequency (RF) receiver, such as at least one RF receiver operable to receive transmissions over a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner). In some examples, the dedicated radio frequency spectrum or the shared radio frequency spectrum may be used for LTE/LTE-A communications, as described, for example, with reference to FIG. 1 or 2. The receiver module 1010 may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum or the shared radio frequency spectrum.

In some examples, the transmitter module 1030 may include at least one RF transmitter, such as at least one RF transmitter operable to transmit over the dedicated radio frequency spectrum or the shared radio frequency spectrum. The transmitter module 1030 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum or the shared radio frequency spectrum.

In some examples, the wireless communication management module 1020 may be used to manage one or more aspects of wireless communication for the apparatus 1015. In some examples, the wireless communication management module 1020 may include a shared RF spectrum monitoring module 1035 or a transmission reception management module 1040.

In some examples, the shared RF spectrum monitoring module 1035 may be used to monitor at least one predetermined symbol period of a subframe for an indication that another wireless device (e.g., a base station) has obtained access to the shared radio frequency spectrum.

The transmission reception management module 1040 may manage the receipt of transmissions from other wireless devices, and in some examples may include (or be included in) part or all of the receiver module 1010. In some examples, the transmission reception management module 1040 may include a transmission starting symbol determination module 1045. The transmission starting symbol determination module 1045 may be used to determine a starting symbol for a transmission by another wireless device over the shared radio frequency spectrum based on detecting the indication, and the transmission reception management module 1040 may be used to receive the transmission by the other wireless device over the shared radio frequency spectrum based on the determined starting symbol.

In some examples, the wireless communication management module 1020 or transmission reception management module 1040 may optionally determine, based on the symbol period including the starting symbol, at least one of: at least one symbol period to monitor for a reference signal; at least one resource element of the shared radio frequency spectrum to monitor for a reference signal or a control channel; a resource element aggregation level for receiving the transmission by the second wireless device; a transport block scaling for receiving the transmission by the second wireless device; a duration of a CUBS transmitted by the second wireless device; a content of the CUBS; or a number of symbols before a next subframe boundary.

Figure 11:
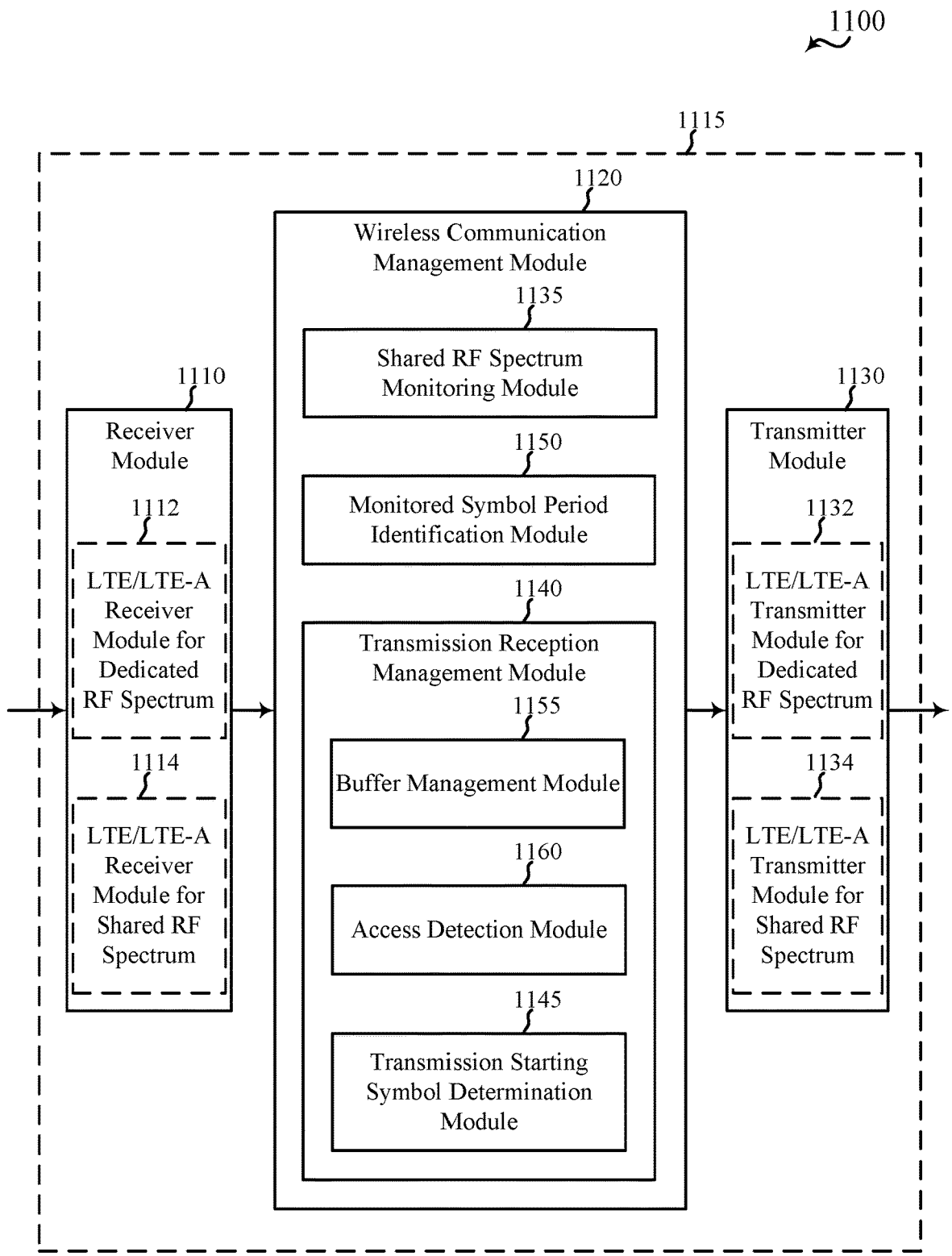
FIG. 11 shows a block diagram of an apparatus for use in wireless communication, in accordance with various aspects of the present disclosure.

FIG. 11 shows a block diagram 1100 of an apparatus 1115 for use in wireless communication, in accordance with various aspects of the present disclosure. The apparatus 1115 may be an example of aspects of one or more of the UEs 115, 215, 215-a, 215-b, or 215-c described with reference to FIG. 1 or 2, or aspects of the apparatus 1015 described with reference to FIG. 10. The apparatus 1115 may also be or include a processor. The apparatus 1115 may include a receiver module 1110, a wireless communication management module 1120, or a transmitter module 1130. Each of these modules may be in communication with each other.

The modules of the apparatus 1115 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1110 may include at least one RF receiver, such as at least one RF receiver operable to receive transmissions over a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner). In some examples, the dedicated radio frequency spectrum or the shared radio frequency spectrum may be used for LTE/LTE-A communications, as described, for example, with reference to FIG. 1 or 2. The receiver module 1110 may in some cases include separate receivers for the dedicated radio frequency spectrum and the shared radio frequency spectrum. The separate receivers may, in some examples, take the form of an LTE/LTE-A receiver module for communicating over the dedicated radio frequency spectrum (e.g., LTE/LTE-A receiver module for dedicated RF spectrum 1112), and an LTE/LTE-A receiver module for communicating over the shared radio frequency spectrum (e.g., LTE/LTE-A receiver module for shared RF spectrum 1114). The receiver module 1110, including the LTE/LTE-A receiver module for dedicated RF spectrum 1112 or the LTE/LTE-A receiver module for shared RF spectrum 1114, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum or the shared radio frequency spectrum.

In some examples, the transmitter module 1130 may include at least one RF transmitter, such as at least one RF transmitter operable to transmit over the dedicated radio frequency spectrum or the shared radio frequency spectrum. The transmitter module 1130 may in some cases include separate transmitters for the dedicated radio frequency spectrum and the shared radio frequency spectrum. The separate transmitters may, in some examples, take the form of an LTE/LTE-A transmitter module for communicating over the dedicated radio frequency spectrum (e.g., LTE/LTE-A transmitter module for dedicated RF spectrum 1132), and an LTE/LTE-A transmitter module for communicating over the shared radio frequency spectrum (e.g., LTE/LTE-A transmitter module for shared RF spectrum 1134). The transmitter module 1130, including the LTE/LTE-A transmitter module for dedicated RF spectrum 1132 or the LTE/LTE-A transmitter module for shared RF spectrum 1134, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum or the second radio frequency spectrum.

In some examples, the wireless communication management module 1120 may be used to manage one or more aspects of wireless communication for the apparatus 1115. In some examples, the wireless communication management module 1120 may include a monitored symbol period identification module 1150, a shared RF spectrum monitoring module 1135 or a transmission reception management module 1140.

In some examples, the monitored symbol period identification module 1150 may be used to identify at least one predetermined symbol period of a subframe to monitor for an indication that another wireless device (e.g., a base station) has obtained access to the shared radio frequency spectrum. In some examples, the at least one predetermined symbol period may be statically or semi-statically configured by an operator with which the apparatus 1115 is associated. In some examples, the at least one predetermined symbol period may be configured by an operator with which the apparatus 1115 is associated for one or more radio frames, one or more subframes of a radio frame, one or more transmissions, or until the at least on predetermined symbol period is changed. In some examples, the at least one predetermined symbol period may be identified (e.g., by the monitored symbol period identification module 1150) based on a duration of a radio frame including the subframe to be monitored. In some examples, the at least one predetermined symbol period may be signaled by RRC messages.

In some examples, the shared RF spectrum monitoring module 1135 may be used to monitor the at least one predetermined symbol period of the subframe for the indication that the other wireless device has obtained access to the shared radio frequency spectrum.

The transmission reception management module 1140 may manage the receipt of transmissions from other wireless devices, and in some examples may include (or be included in) part or all of the LTE/LTE-A receiver module for shared RF spectrum 1114. In some examples, the transmission reception management module 1140 may include a buffer management module 1155, an access detection module 1160, or a transmission starting symbol determination module 1145. The buffer management module 1155 may be used to buffer, prior to determining a starting symbol for a transmission by the other wireless device over the shared radio frequency spectrum, a signal including at least a portion of the transmission.

The access detection module 1160 may be used to detect the indication that the other wireless device has obtained access to the shared radio frequency spectrum. In some examples, the indication may be detected in a symbol transmitted after the starting symbol.

The transmission starting symbol determination module 1145 may be used to determine the starting symbol for the transmission by the other wireless device, over the shared radio frequency spectrum, based on detecting the indication; and the transmission reception management module 1140 may be used to receive the transmission by the other wireless device based on the determined starting symbol. In some examples, receiving the transmission by the other wireless device may include processing at least a portion of the signal buffered by the buffer management module 1155.

In some examples of the apparatus 1115, a plurality of predetermined symbol periods may be identified by the monitored symbol period identification module 1150 and monitored by the shared RF spectrum monitoring module 1135. In these examples, the indication may be detected by the access detection module 1160, in one of the predetermined symbol periods.

Figure 12:
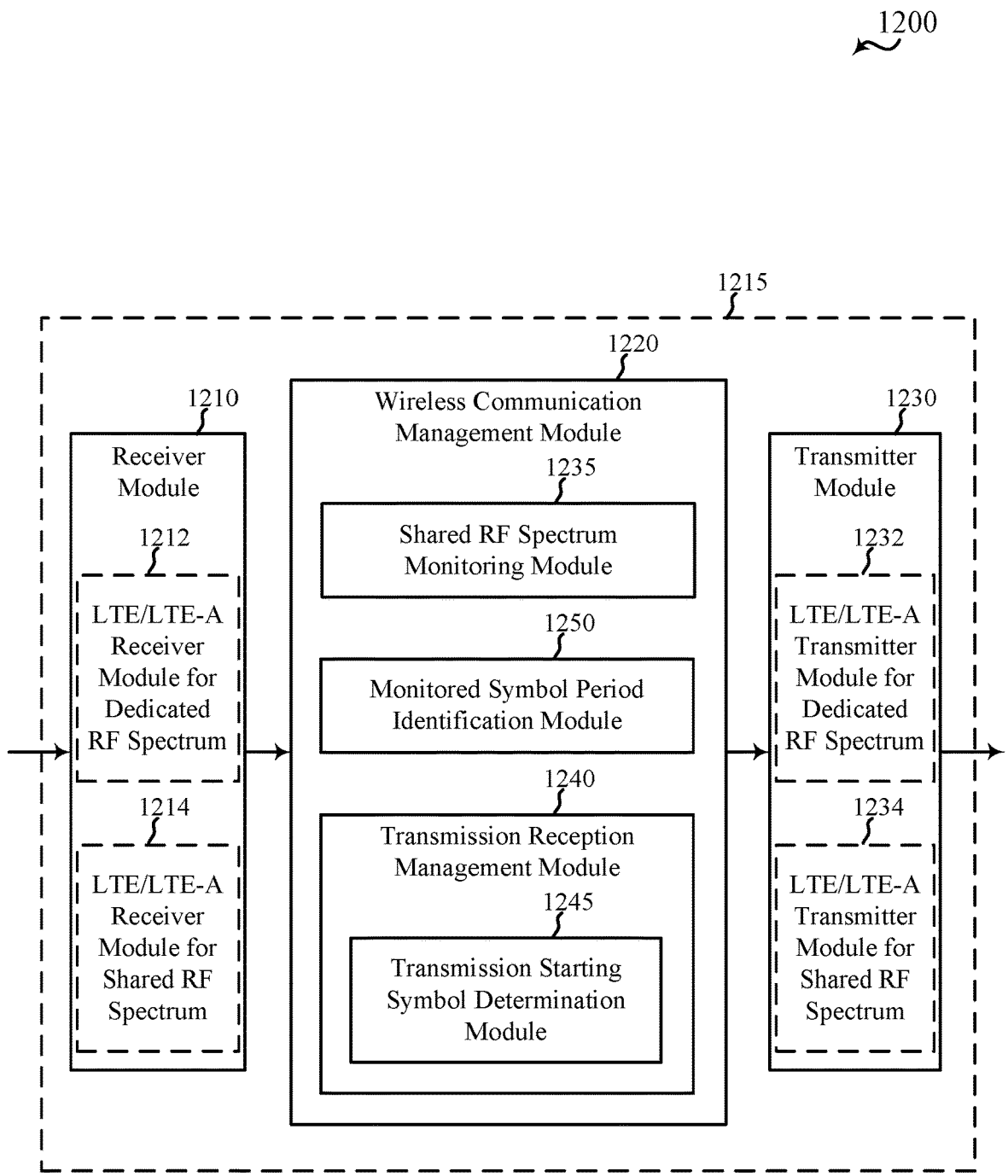
FIG. 12 shows a block diagram of an apparatus for use in wireless communication, in accordance with various aspects of the present disclosure.

FIG. 12 shows a block diagram 1200 of an apparatus 1215 for use in wireless communication, in accordance with various aspects of the present disclosure. The apparatus 1215 may be an example of aspects of one or more of the UEs 115, 215, 215-a, 215-b, or 215-c described with reference to FIG. 1 or 2, or aspects of the apparatus 1015 or 1115 described with reference to FIG. 10 or 11. The apparatus 1215 may also be or include a processor. The apparatus 1215 may include a receiver module 1210, a wireless communication management module 1220, or a transmitter module 1230. Each of these modules may be in communication with each other.

The modules of the apparatus 1215 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1210 may include at least one RF receiver, such as at least one RF receiver operable to receive transmissions over a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner). In some examples, the dedicated radio frequency spectrum or the shared radio frequency spectrum may be used for LTE/LTE-A communications, as described, for example, with reference to FIG. 1 or 2. The receiver module 1210 may in some cases include separate receivers for the dedicated radio frequency spectrum and the shared radio frequency spectrum. The separate receivers may, in some examples, take the form of an LTE/LTE-A receiver module for communicating over the dedicated radio frequency spectrum (e.g., LTE/LTE-A receiver module for dedicated RF spectrum 1212), and an LTE/LTE-A receiver module for communicating over the shared radio frequency spectrum (e.g., LTE/LTE-A receiver module for shared RF spectrum 1214). The receiver module 1210, including the LTE/LTE-A receiver module for dedicated RF spectrum 1212 or the LTE/LTE-A receiver module for shared RF spectrum 1214, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum or the shared radio frequency spectrum.

In some examples, the transmitter module 1230 may include at least one RF transmitter, such as at least one RF transmitter operable to transmit over the dedicated radio frequency spectrum or the shared radio frequency spectrum. The transmitter module 1230 may in some cases include separate transmitters for the dedicated radio frequency spectrum and the shared radio frequency spectrum. The separate transmitters may, in some examples, take the form of an LTE/LTE-A transmitter module for communicating over the dedicated radio frequency spectrum (e.g., LTE/LTE-A transmitter module for dedicated RF spectrum 1232), and an LTE/LTE-A transmitter module for communicating over the shared radio frequency spectrum (e.g., LTE/LTE-A transmitter module for shared RF spectrum 1234). The transmitter module 1230, including the LTE/LTE-A transmitter module for dedicated RF spectrum 1232 or the LTE/LTE-A transmitter module for shared RF spectrum 1234, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum or the second radio frequency spectrum.

In some examples, the wireless communication management module 1220 may be used to manage one or more aspects of wireless communication for the apparatus 1215. In some examples, the wireless communication management module 1220 may include a monitored symbol period identification module 1250, a shared RF spectrum monitoring module 1235 or a transmission reception management module 1240.

In some examples, the monitored symbol period identification module 1250 may be used to identify at least one predetermined symbol period of a subframe to monitor for an indication that another wireless device (e.g., a base station) has obtained access to the shared radio frequency spectrum. In some examples, the at least one predetermined symbol period may be statically or semi-statically configured by an operator with which the apparatus 1215 is associated. In some examples, the at least one predetermined symbol period may be configured by an operator with which the apparatus 1215 is associated for one or more radio frames, one or more subframes of a radio frame, one or more transmissions, or until the at least on predetermined symbol period is changed. In some examples, the at least one predetermined symbol period may be identified (e.g., by the monitored symbol period identification module 1250) based on a duration of a radio frame including the subframe to be monitored.

In some examples, the shared RF spectrum monitoring module 1235 may be used to monitor the at least one predetermined symbol period of the subframe for the indication that the other wireless device has obtained access to the shared radio frequency spectrum. In some examples, the indication may include an energy above a threshold on the shared radio frequency spectrum.

The transmission reception management module 1240 may manage the receipt of transmissions from other wireless devices, and in some examples may include (or be included in) part or all of the LTE/LTE-A receiver module for shared RF spectrum 1214. In some examples, the transmission reception management module 1240 may include an access detection module 1260, or a transmission starting symbol determination module 1245. The access detection module 1260 may be used to detect the indication that the other wireless device has obtained access to the shared radio frequency spectrum. The indication may be detected in one of the at least one predetermined symbol period.

The transmission starting symbol determination module 1245 may be used to determine the starting symbol for the transmission by the other wireless device, over the shared radio frequency spectrum, based on detecting the indication. In some examples, determining the starting symbol may include identifying the starting symbol as a symbol occupying a symbol period in which the indication that the other wireless device has obtained access to the shared radio frequency spectrum is detected. The transmission reception management module 1240 may be used to receive the transmission by the other wireless device based on the determined starting symbol.

In some examples of the apparatus 1215, a plurality of predetermined symbol periods may be identified by the monitored symbol period identification module 1250 and monitored by the shared RF spectrum monitoring module 1235. In these examples, the indication may be detected by the access detection module 1260, in one of the predetermined symbol periods.

Figure 13:
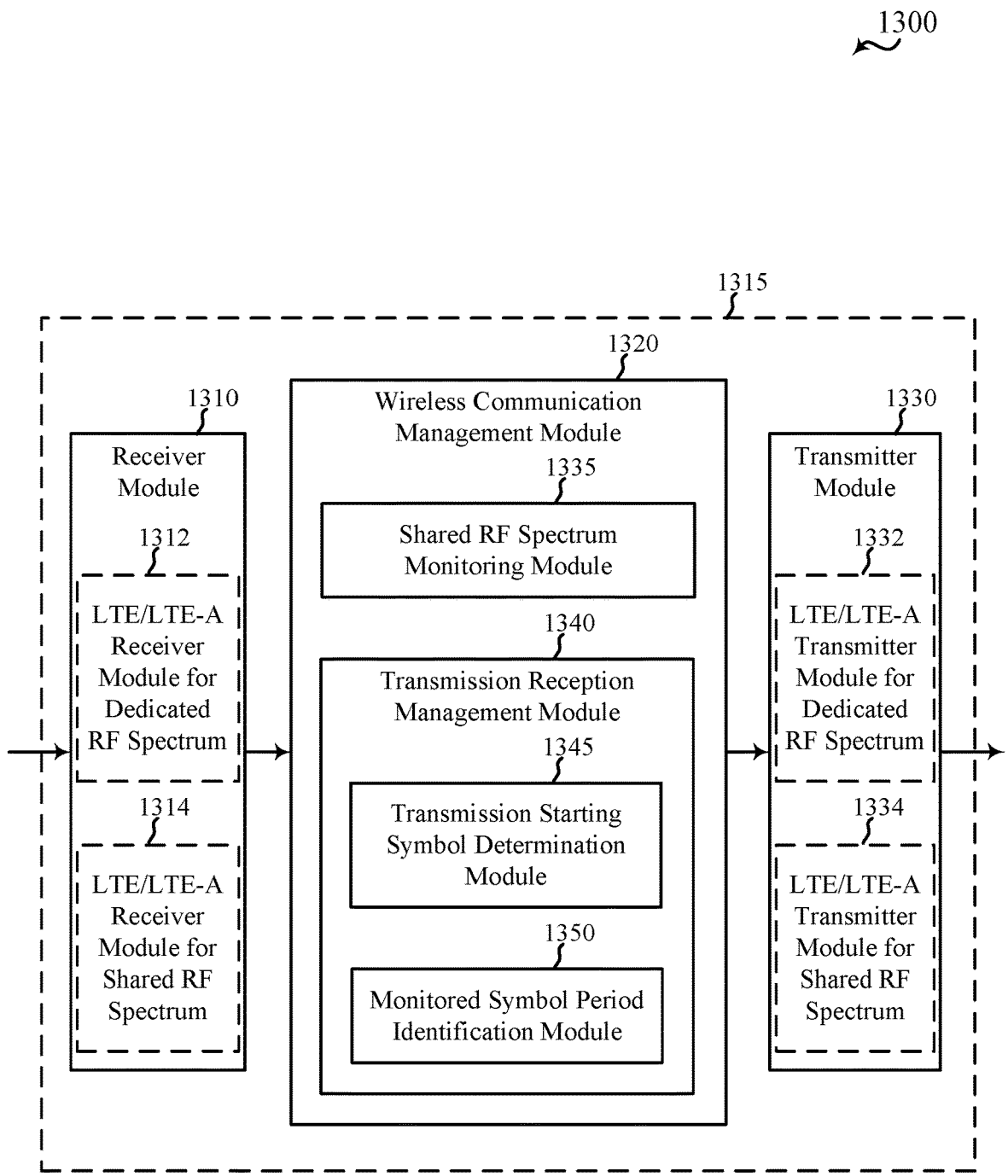
FIG. 13 shows a block diagram of an apparatus for use in wireless communication, in accordance with various aspects of the present disclosure.

FIG. 13 shows a block diagram 1300 of an apparatus 1315 for use in wireless communication, in accordance with various aspects of the present disclosure. The apparatus 1315 may be an example of aspects of one or more of the UEs 115, 215, 215-*a*, 215-*b*, or 215-*c* described with reference to FIG. 1 or 2, or aspects of the apparatus 1015, 1115, or 1215 described with reference to FIG. 10, 11, or 12. The apparatus 1315 may also be or include a processor. The apparatus 1315 may include a receiver module 1310, a wireless communication management module 1320, or a transmitter module 1330. Each of these modules may be in communication with each other.

The modules of the apparatus 1315 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1310 may include at least one RF receiver, such as at least one RF receiver operable to receive transmissions over a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner). In some examples, the dedicated radio frequency spectrum or the shared radio frequency spectrum may be used for LTE/LTE-A communications, as described, for example, with reference to FIG. 1 or 2. The receiver module 1310 may in some cases include separate receivers for the dedicated radio frequency spectrum and the shared radio frequency spectrum. The separate receivers may, in some examples, take the form of an LTE/LTE-A receiver module for communicating over the dedicated radio frequency spectrum (e.g., LTE/LTE-A receiver module for dedicated RF spectrum 1312), and an LTE/LTE-A receiver module for communicating over the shared radio frequency spectrum (e.g., LTE/LTE-A receiver module for shared RF spectrum 1314). The receiver module 1310, including the LTE/LTE-A receiver module for dedicated RF spectrum 1312 or the LTE/LTE-A receiver module for shared RF spectrum 1314, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum or the shared radio frequency spectrum.

In some examples, the transmitter module 1330 may include at least one RF transmitter, such as at least one RF transmitter operable to transmit over the dedicated radio frequency spectrum or the shared radio frequency spectrum. The transmitter module 1330 may in some cases include separate transmitters for the dedicated radio frequency spectrum and the shared radio frequency spectrum. The separate transmitters may, in some examples, take the form of an LTE/LTE-A transmitter module for communicating over the dedicated radio frequency spectrum (e.g., LTE/LTE-A transmitter module for dedicated RF spectrum 1332), and an LTE/LTE-A transmitter module for communicating over the shared radio frequency spectrum (e.g., LTE/LTE-A transmitter module for shared RF spectrum 1334). The transmitter module 1330, including the LTE/LTE-A transmitter module for dedicated RF spectrum 1332 or the LTE/LTE-A transmitter module for shared RF spectrum 1334, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum or the second radio frequency spectrum.

In some examples, the wireless communication management module 1320 may be used to manage one or more aspects of wireless communication for the apparatus 1315. In some examples, the wireless communication management module 1320 may include a shared RF spectrum monitoring module 1335 or a transmission reception management module 1340.

In some examples, the shared RF spectrum monitoring module 1335 may be used to monitor at least one predetermined symbol period of a subframe for an indication that another wireless device (e.g., a base station) has obtained access to the shared radio frequency spectrum.

The transmission reception management module 1340 may manage the receipt of transmissions from other wireless devices, and in some examples may include (or be included in) part or all of the receiver module 1310. In some examples, the transmission reception management module 1340 may include a transmission starting symbol determination module 1345 or a virtual subframe mapping determination module 1350. The transmission starting symbol determination module 1345 may be used to determine a starting symbol for a transmission by another wireless device over the shared radio frequency spectrum based on detecting the indication. The virtual subframe mapping determination module 1350 may be used to determine a mapping of the transmission by the other wireless device to a virtual subframe spanning more than one subframe of a radio frame. The transmission reception management module 1340 may be used to receive the transmission by the other wireless device over the shared radio frequency spectrum based on the determined starting symbol. The transmission may be received across the more than one subframe of the radio frame (i.e., according to the mapping of the transmission to the virtual subframe, as determined by the virtual subframe mapping determination module 1350).

In some examples, the transmission reception management module 1340 may be used to receive a reference signal as part of the transmission by the other wireless device, and a timing of receiving the reference signal may be determined by a format of a subframe of the radio frame.

Figure 14:
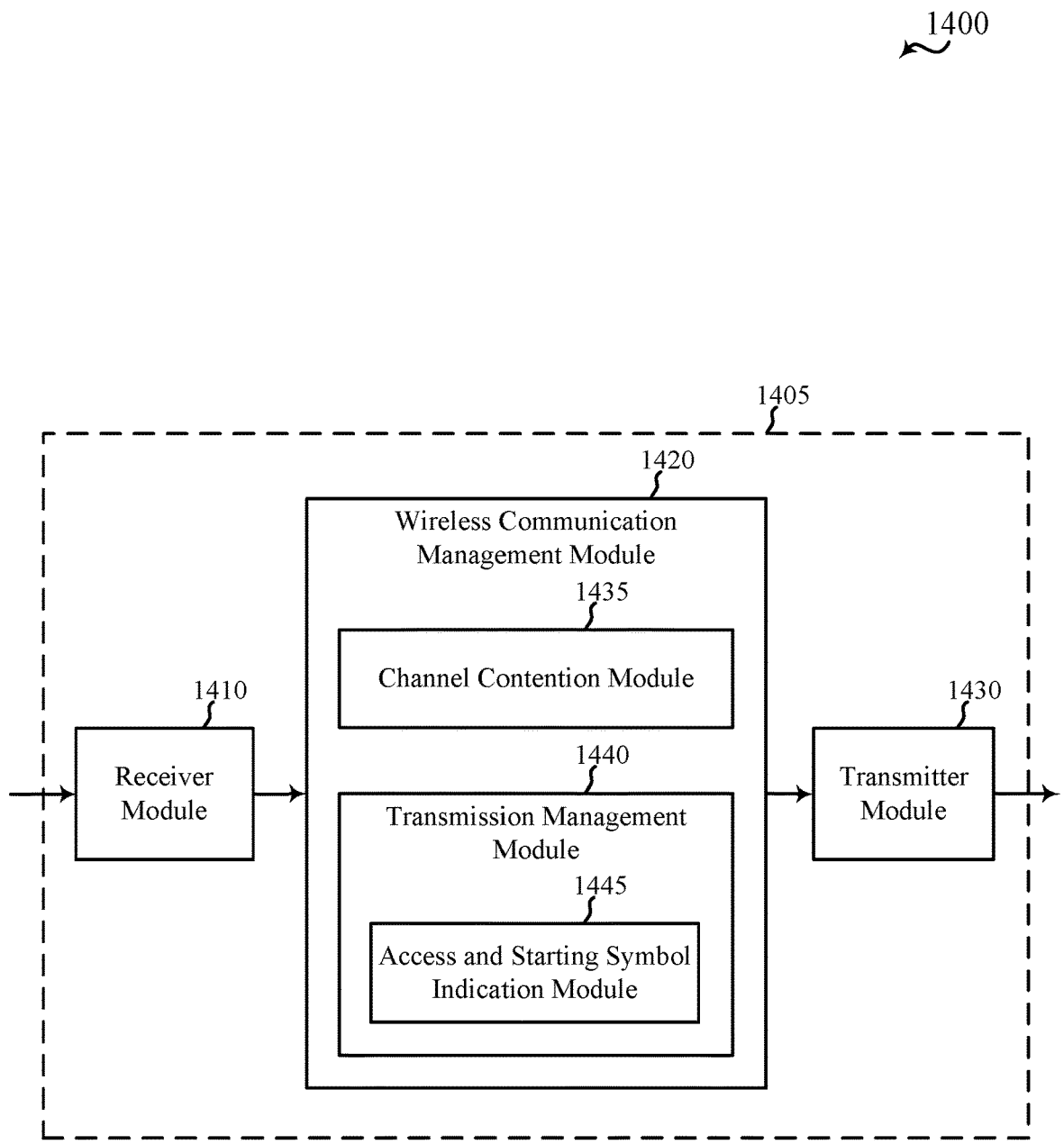
FIG. 14 shows a block diagram of an apparatus for use in wireless communication, in accordance with various aspects of the present disclosure.

FIG. 14 shows a block diagram 1400 of an apparatus 1405 for use in wireless communication, in accordance with various aspects of the present disclosure. The apparatus 1405 may be an example of aspects of one or more of the base stations 105, 205, or 205-*a* described with reference to FIG. 1 or 2. The apparatus 1405 may also be or include a processor. The apparatus 1405 may include a receiver module 1410, a wireless communication management module 1420, or a transmitter module 1430. Each of these modules may be in communication with each other.

The modules of the apparatus 1405 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1410 may include at least one RF receiver, such as at least one RF receiver operable to receive transmissions over a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner). In some examples, the dedicated radio frequency spectrum or the shared radio frequency spectrum may be used for LTE/LTE-A communications, as described, for example, with reference to FIG. 1 or 2. The receiver module 1410 may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum or the shared radio frequency spectrum.

In some examples, the transmitter module 1430 may include at least one RF transmitter, such as at least one RF transmitter operable to transmit over the dedicated radio frequency spectrum or the shared radio frequency spectrum. The transmitter module 1430 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum or the shared radio frequency spectrum.

In some examples, the wireless communication management module 1420 may be used to manage one or more aspects of wireless communication for the apparatus 1405. In some examples, the wireless communication management module 1420 may include a channel contention module 1435 or a transmission management module 1440.

In some examples, the channel contention module 1435 may be used to contend for access to a shared radio frequency spectrum and obtain access to the shared radio frequency spectrum. In some examples, contending for access to the shared radio frequency spectrum may include performing a CCA procedure, and obtaining access to the shared radio frequency spectrum may include successfully performing a CCA procedure.

The transmission management module 1440 may manage transmissions to other wireless devices (e.g., UEs), and in some examples may include (or be included in) part or all of the transmitter module 1430. In some examples, the transmission management module 1440 may include an access and starting symbol indication module 1445. The access and starting symbol indication module 1445 may be used to transmit, to another wireless device (e.g., a UE) and in a predetermined symbol period of a subframe, an indication that the apparatus 1405 has obtained access to the shared radio frequency spectrum. The indication may convey a symbol period including a starting symbol of a transmission to the other wireless device by the apparatus 1405. In some examples, the predetermined symbol period may include the starting symbol of the transmission to the other wireless device. In some examples, the access and starting symbol indication module 1445 may select the predetermined symbol period based on a duration of a radio frame including the transmission.

The transmission management module 1440 may begin the transmission to the other wireless device over the shared radio frequency spectrum according to the indicated starting symbol. In some examples, the transmission management module 1440 may begin the transmission to the other wireless device before the access and starting symbol indication module 1445 transmits the indication that the second wireless device has obtained access to the shared radio frequency spectrum.

In some examples of the apparatus 1405, the transmission to the other wireless device may include a PDCCH, and the transmission management module 1440 may adjust a transmit power for the PDCCH based on the symbol period including the starting symbol.

In some examples, the wireless communication management module 1420 or transmission management module 1440 may optionally determine, based on the symbol period including the starting symbol, at least one of: at least one symbol period to use for transmitting a reference signal; at least one resource element of the shared radio frequency spectrum to use for transmitting a reference signal or a control channel; a resource element aggregation level for the transmission to the first wireless device; a transport block scaling for the transmission to the first wireless device; a duration of a CUBS; a content of the CUBS; or a number of symbols before a next subframe boundary.

Figure 15:
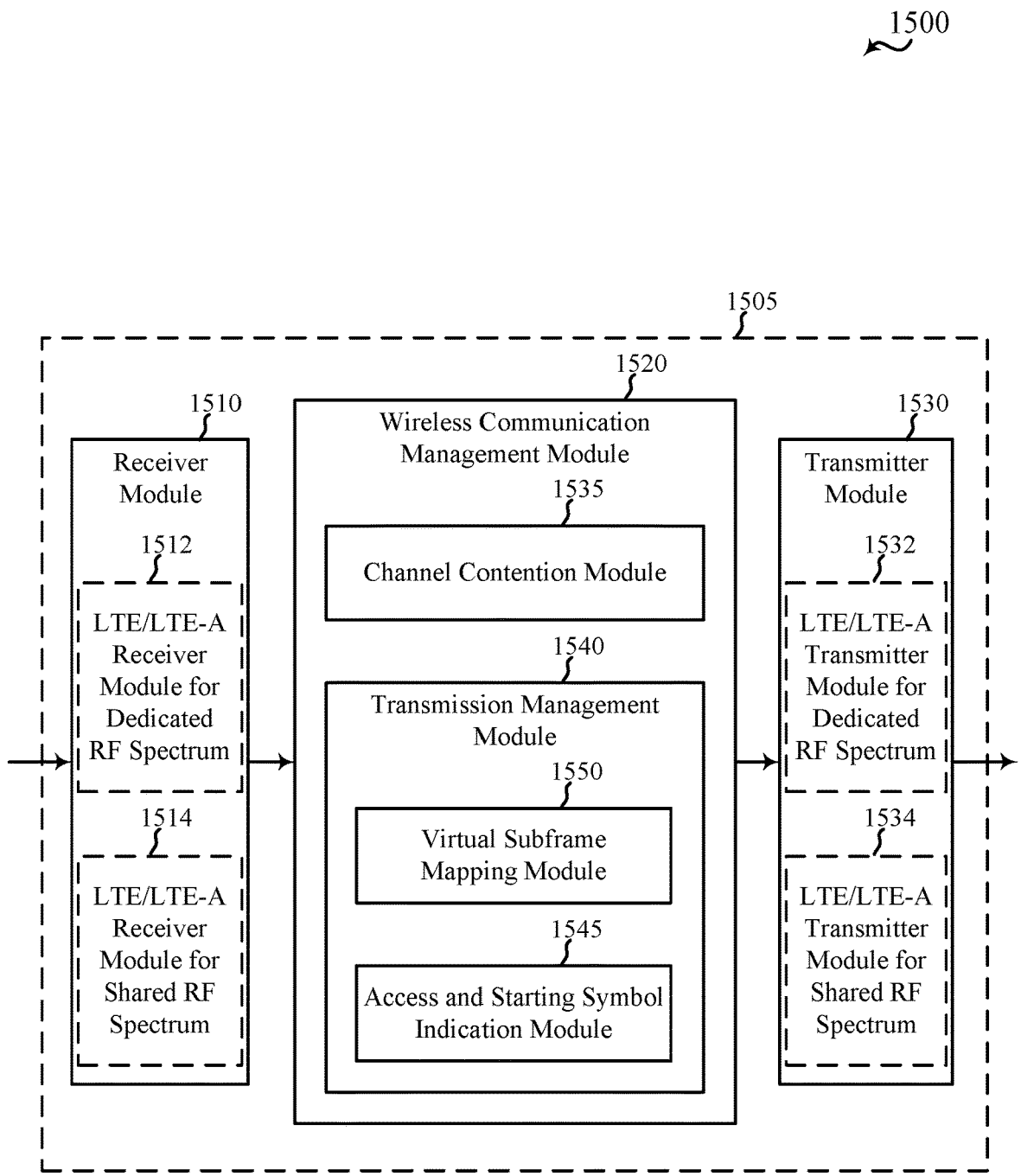
FIG. 15 shows a block diagram of an apparatus for use in wireless communication, in accordance with various aspects of the present disclosure.

FIG. 15 shows a block diagram 1500 of an apparatus 1505 for use in wireless communication, in accordance with various aspects of the present disclosure. The apparatus 1505 may be an example of aspects of one or more of the base stations 105, 205, or 205-*a* described with reference to FIG. 1 or 2, or aspects of the apparatus 1405 described with reference to FIG. 14. The apparatus 1505 may also be or include a processor. The apparatus 1505 may include a receiver module 1510, a wireless communication management module 1520, or a transmitter module 1530. Each of these modules may be in communication with each other.

The modules of the apparatus 1505 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1510 may include at least one RF receiver, such as at least one RF receiver operable to receive transmissions over a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner). In some examples, the dedicated radio frequency spectrum or the shared radio frequency spectrum may be used for LTE/LTE-A communications, as described, for example, with reference to FIG. 1 or 2. The receiver module 1510 may in some cases include separate receivers for the dedicated radio frequency spectrum and the shared radio frequency spectrum. The separate receivers may, in some examples, take the form of an LTE/LTE-A receiver module for communicating over the dedicated radio frequency spectrum (e.g., LTE/LTE-A receiver module for dedicated RF spectrum 1512), and an LTE/LTE-A receiver module for communicating over the shared radio frequency spectrum (e.g., LTE/LTE-A receiver module for shared RF spectrum 1514). The receiver module 1510, including the LTE/LTE-A receiver module for dedicated RF spectrum 1512 or the LTE/LTE-A receiver module for shared RF spectrum 1514, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum or the shared radio frequency spectrum.

In some examples, the transmitter module 1530 may include at least one RF transmitter, such as at least one RF transmitter operable to transmit over the dedicated radio frequency spectrum or the shared radio frequency spectrum. The transmitter module 1530 may in some cases include separate transmitters for the dedicated radio frequency spectrum and the shared radio frequency spectrum. The separate transmitters may, in some examples, take the form of an LTE/LTE-A transmitter module for communicating over the dedicated radio frequency spectrum (e.g., LTE/LTE-A transmitter module for dedicated RF spectrum 1532), and an LTE/LTE-A transmitter module for communicating over the shared radio frequency spectrum (e.g., LTE/LTE-A transmitter module for shared RF spectrum 1534). The transmitter module 1530, including the LTE/LTE-A transmitter module for dedicated RF spectrum 1532 or the LTE/LTE-A transmitter module for shared RF spectrum 1534, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum or the second radio frequency spectrum.

In some examples, the wireless communication management module 1520 may be used to manage one or more aspects of wireless communication for the apparatus 1505. In some examples, the wireless communication management module 1520 may include a channel contention module 1535 or a transmission management module 1540.

In some examples, the channel contention module 1535 may be used to contend for access to a shared radio frequency spectrum and obtain access to the shared radio frequency spectrum. In some examples, contending for access to the shared radio frequency spectrum may include performing a CCA procedure, and obtaining access to the shared radio frequency spectrum may include successfully performing a CCA procedure.

The transmission management module 1540 may manage transmissions to other wireless devices (e.g., UEs), and in some examples may include (or be included in) part or all of the transmitter module 1530. In some examples, the transmission management module 1540 may include a virtual subframe mapping module 1550 or an access and starting symbol indication module 1545. The virtual subframe mapping module 1550 may be used to map a transmission to another wireless device (e.g., a UE) to a virtual subframe spanning more than one subframe of a radio frame. The access and starting symbol indication module 1545 may be used to transmit, to another wireless device (e.g., a UE) and in a predetermined symbol period of a subframe, an indication that the apparatus 1505 has obtained access to the shared radio frequency spectrum. The indication may convey a symbol period including a starting symbol of a transmission to the other wireless device by the apparatus 1505. In some examples, the predetermined symbol period may include the starting symbol of the transmission to the other wireless device. In some examples, the access and starting symbol indication module 1545 may select the predetermined symbol period based on a duration of a radio frame including the transmission.

The transmission management module 1540 may begin the transmission to the other wireless device over the shared radio frequency spectrum according to the indicated starting symbol. In some examples, beginning the transmission to the first wireless device may include transmitting the virtual subframe to the first wireless device. In some examples, the transmission management module 1540 may begin the transmission to the other wireless device before the access and starting symbol indication module 1545 transmits the indication that the second wireless device has obtained access to the shared radio frequency spectrum.

In some examples of the apparatus 1505, the transmission to the other wireless device may include a PDCCH, and the transmission management module 1540 may adjust a transmit power for the PDCCH based on the symbol period including the starting symbol.

In some examples of the apparatus 1505, the virtual subframe may include a reference signal, and the reference signal may have a timing determined by a format of a subframe of the radio frame.

In some examples of the apparatus 1505, the transmission to the first wireless device may include a PDCCH, and the transmission management module 1540 may adjust a transmit power for the PDCCH based on the symbol period including the starting symbol.

Figure 16:
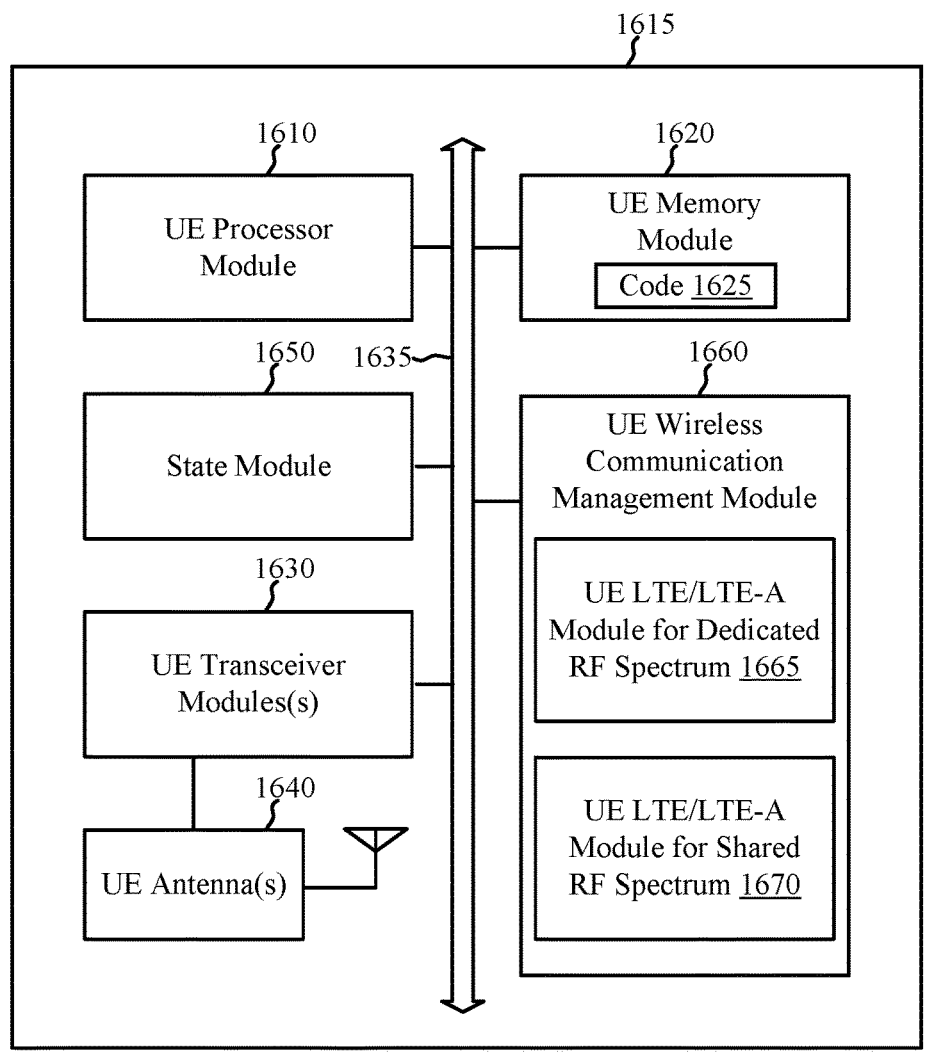
FIG. 16 shows a block diagram of a UE for use in wireless communication, in accordance with various aspects of the present disclosure.

FIG. 16 shows a block diagram 1600 of a UE 1615 for use in wireless communication, in accordance with various aspects of the present disclosure. The UE 1615 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1615 may, in some examples, have an internal power supply (not shown), such as a small battery, to facilitate mobile operation. In some examples, the UE 1615 may be an example of aspects of one or more of the UEs 115, 215, 215-*a*, 215-*b*, or 215-*c* described with reference to FIG. 1 or 2, or aspects of one or more of the apparatuses 1015, 1115, 1215, or 1315 described with reference to FIG. 10, 11, 12, or 13. The UE 1615 may be configured to implement at least some of the UE or apparatus features and functions described with reference to FIG. 1, 2, 3, 4, 5, 6, 7, 8, 9, 10, 11, 12, or 13.

The UE 1615 may include a UE processor module 1610, a UE memory module 1620, at least one UE transceiver module (represented by UE transceiver module(s) 1630), at least one UE antenna (represented by UE antenna(s) 1640), or a UE wireless communication management module 1660. Each of these components may be in communication with each other, directly or indirectly, over one or more buses 1635.

The UE memory module 1620 may include random access memory (RAM) or read-only memory (ROM). The UE memory module 1620 may store computer-readable, computer-executable code 1625 containing instructions that are configured to, when executed, cause the UE processor module 1610 to perform various functions described herein related to wireless communication, including receiving a transmission (e.g., from a base station) based on a determined starting symbol for the transmission. Alternatively, the code 1625 may not be directly executable by the UE processor module 1610 but be configured to cause the UE 1615 (e.g., when compiled and executed) to perform various of the functions described herein.

The UE processor module 1610 may include an intelligent hardware device, e.g., a central processing unit (CPU), a microcontroller, an ASIC, etc. The UE processor module 1610 may process information received through the UE transceiver module(s) 1630 or information to be sent to the UE transceiver module(s) 1630 for transmission through the UE antenna(s) 1640. The UE processor module 1610 may handle, alone or in connection with the UE wireless communication management module 1660, various aspects of communicating over (or managing communications over) a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner).

The UE transceiver module(s) 1630 may include a modem configured to modulate packets and provide the modulated packets to the UE antenna(s) 1640 for transmission, and to demodulate packets received from the UE antenna(s) 1640. The UE transceiver module(s) 1630 may, in some examples, be implemented as one or more UE transmitter modules and one or more separate UE receiver modules. The UE transceiver module(s) 1630 may support communications in the licensed radio frequency spectrum or the unlicensed radio frequency spectrum. The UE transceiver module(s) 1630 may be configured to communicate bi-directionally, via the UE antenna(s) 1640, with one or more of the base stations 105, 205, or 205-*a* described with reference to FIG. 1 or 2, or one or more of the apparatuses 1015, 1115, 1215, or 1315 described with reference to FIG. 10, 11, 12, or 13. While the UE 1615 may include a single UE antenna, there may be examples in which the UE 1615 may include multiple UE antennas 1640.

The UE state module 1650 may be used, for example, to manage transitions of the UE 1615 between an RRC idle state and an RRC connected state, and may be in communication with other components of the UE 1615, directly or indirectly, over the one or more buses 1635. The UE state module 1650, or portions of it, may include a processor, or some or all of the functions of the UE state module 1650 may be performed by the UE processor module 1610 or in connection with the UE processor module 1610.

The UE wireless communication management module 1660 may be configured to perform or control some or all of the UE or apparatus features or functions described with reference to FIG. 1, 2, 3, 4, 5, 6, 7, 8, 9, 10, 11, 12, or 13 related to wireless communication over the dedicated radio frequency spectrum or the shared radio frequency spectrum. For example, the UE wireless communication management module 1660 may be configured to support a supplemental downlink mode (e.g., a licensed assisted access mode), a carrier aggregation mode, or a standalone mode using the dedicated radio frequency spectrum or the shared radio frequency spectrum. The UE wireless communication management module 1660 may include a UE LTE/LTE-A module for dedicated RF spectrum 1665 configured to handle LTE/LTE-A communications in the dedicated radio frequency spectrum, and a UE LTE/LTE-A module for shared RF spectrum 1670 configured to handle LTE/LTE-A communications in the shared radio frequency spectrum. The UE wireless communication management module 1660, or portions of it, may include a processor, or some or all of the functions of the UE wireless communication management module 1660 may be performed by the UE processor module 1610 or in connection with the UE processor module 1610. In some examples, the UE wireless communication management module 1660 may be an example of the wireless communication management module 1020, 1120, 11220, or 1320 described with reference to FIG. 10, 11, 12, or 13.

Figure 17:
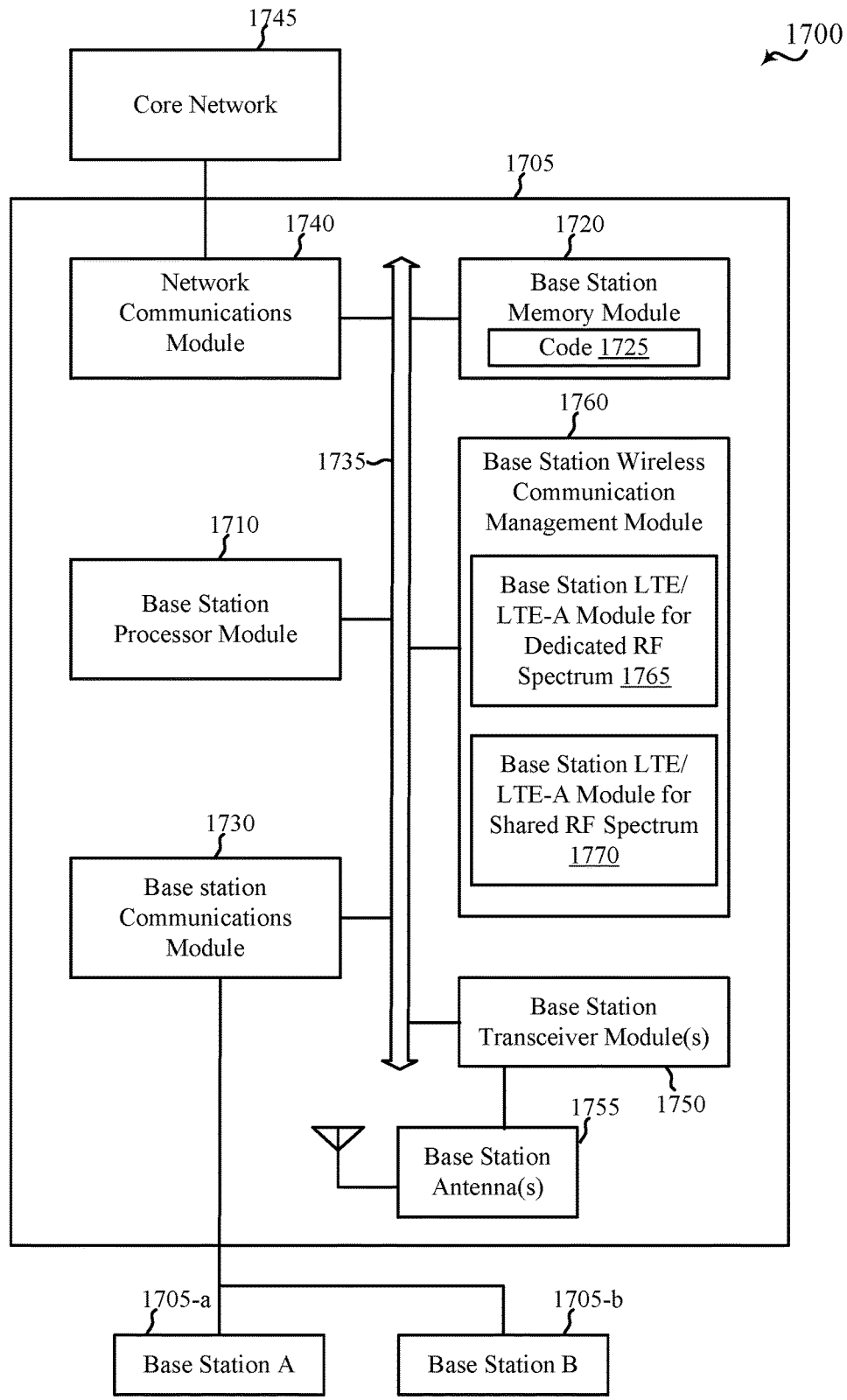
FIG. 17 shows a block diagram of a base station (e.g., a base station forming part or all of an eNB) for use in wireless communication, in accordance with various aspects of the present disclosure.

FIG. 17 shows a block diagram 1700 of a base station 1705 (e.g., a base station forming part or all of an eNB) for use in wireless communication, in accordance with various aspects of the present disclosure. In some examples, the base station 1705 may be an example of one or more aspects of the base station 105, 205, or 205-a described with reference to FIG. 1 or 2, or aspects of one or more of the apparatuses 1405 or 1505 described with reference to FIG. 14 or 15. The base station 1705 may be configured to implement or facilitate at least some of the base station features and functions described with reference to FIG. 1, 2, 3, 4, 5, 6, 7, 8, 9, 14, or 15.

The base station 1705 may include a base station processor module 1710, a base station memory module 1720, at least one base station transceiver module (represented by base station transceiver module(s) 1750), at least one base station antenna (represented by base station antenna(s) 1755), or a base station wireless communication management module 1760. The base station 1705 may also include one or more of a base station communications module 1730 or a network communications module 1740. Each of these components may be in communication with each other, directly or indirectly, over one or more buses 1735.

The base station memory module 1720 may include RAM or ROM. The base station memory module 1720 may store computer-readable, computer-executable code 1725 containing instructions that are configured to, when executed, cause the base station processor module 1710 to perform various functions described herein related to wireless communication, including obtaining access to a shared radio frequency spectrum, transmitting to a UE an indication that access to the shared radio frequency spectrum has been obtained (with the indication conveying a symbol period including a starting symbol of a transmission to the UE), and making the transmission to the UE according to the indicated starting symbol. Alternatively, the code 1725 may not be directly executable by the base station processor module 1710 but be configured to cause the base station 1705 (e.g., when compiled and executed) to perform various of the functions described herein.

The base station processor module 1710 may include an intelligent hardware device, e.g., a CPU, a microcontroller, an ASIC, etc. The base station processor module 1710 may process information received through the base station transceiver module(s) 1750, the base station communications module 1730, or the network communications module 1740. The base station processor module 1710 may also process information to be sent to the transceiver module(s) 1750 for transmission through the antenna(s) 1755, to the base station communications module 1730, for transmission to one or more other base stations 1705-a and 1705-b, or to the network communications module 1740 for transmission to a core network 1745, which may be an example of one or more aspects of the core network 130 described with reference to FIG. 1. The base station processor module 1710 may handle, alone or in connection with the base station wireless communication management module 1760, various aspects of communicating over (or managing communications over) a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner).

The base station transceiver module(s) 1750 may include a modem configured to modulate packets and provide the modulated packets to the base station antenna(s) 1755 for transmission, and to demodulate packets received from the base station antenna(s) 1755. The base station transceiver module(s) 1750 may, in some examples, be implemented as one or more base station transmitter modules and one or more separate base station receiver modules. The base station transceiver module(s) 1750 may support communications in the dedicated radio frequency spectrum or the shared radio frequency spectrum. The base station transceiver module(s) 1750 may be configured to communicate bi-directionally, via the antenna(s) 1755, with one or more UEs or apparatuses, such as one or more of the UEs 115, 215, 215-a, 215-b, 215-c, or 1615 described with reference to FIG. 1, 2, or 16, or one or more of the apparatuses 1015, 1115, 1215, or 1315 described with reference to FIG. 10, 11, 12, or 13. The base station 1705 may, for example, include multiple base station antennas 1755 (e.g., an antenna array). The base station 1705 may communicate with the core network 1745 through the network communications module 1740. The base station 1705 may also communicate with other base stations, such as the base stations 1705-a and 1705-b, using the base station communications module 1730.

The base station wireless communication management module 1760 may be configured to perform or control some or all of the features or functions described with reference to FIG. 1, 2, 3, 4, 5, 6, 7, 8, 9, 14, or 15 related to wireless communication over the dedicated radio frequency spectrum or the shared radio frequency spectrum. For example, the base station wireless communication management module 1760 may be configured to support a supplemental downlink mode (e.g., a licensed assisted access mode), a carrier aggregation mode, or a standalone mode using the dedicated radio frequency spectrum or the shared radio frequency spectrum. The base station wireless communication management module 1760 may include a base station LTE/LTE-A module for dedicated RF spectrum 1765 configured to handle LTE/LTE-A communications in the dedicated radio frequency spectrum, and a base station LTE/LTE-A module for shared RF spectrum 1770 configured to handle LTE/LTE-A communications in the shared radio frequency spectrum. The base station wireless communication management module 1760, or portions of it, may include a processor, or some or all of the functions of the base station wireless communication management module 1760 may be performed by the base station processor module 1710 or in connection with the base station processor module 1710. In some examples, the base station wireless communication management module 1760 may be an example of the wireless communication management module 1420 or 1520 described with reference to FIG. 14 or 15.

Figure 18:
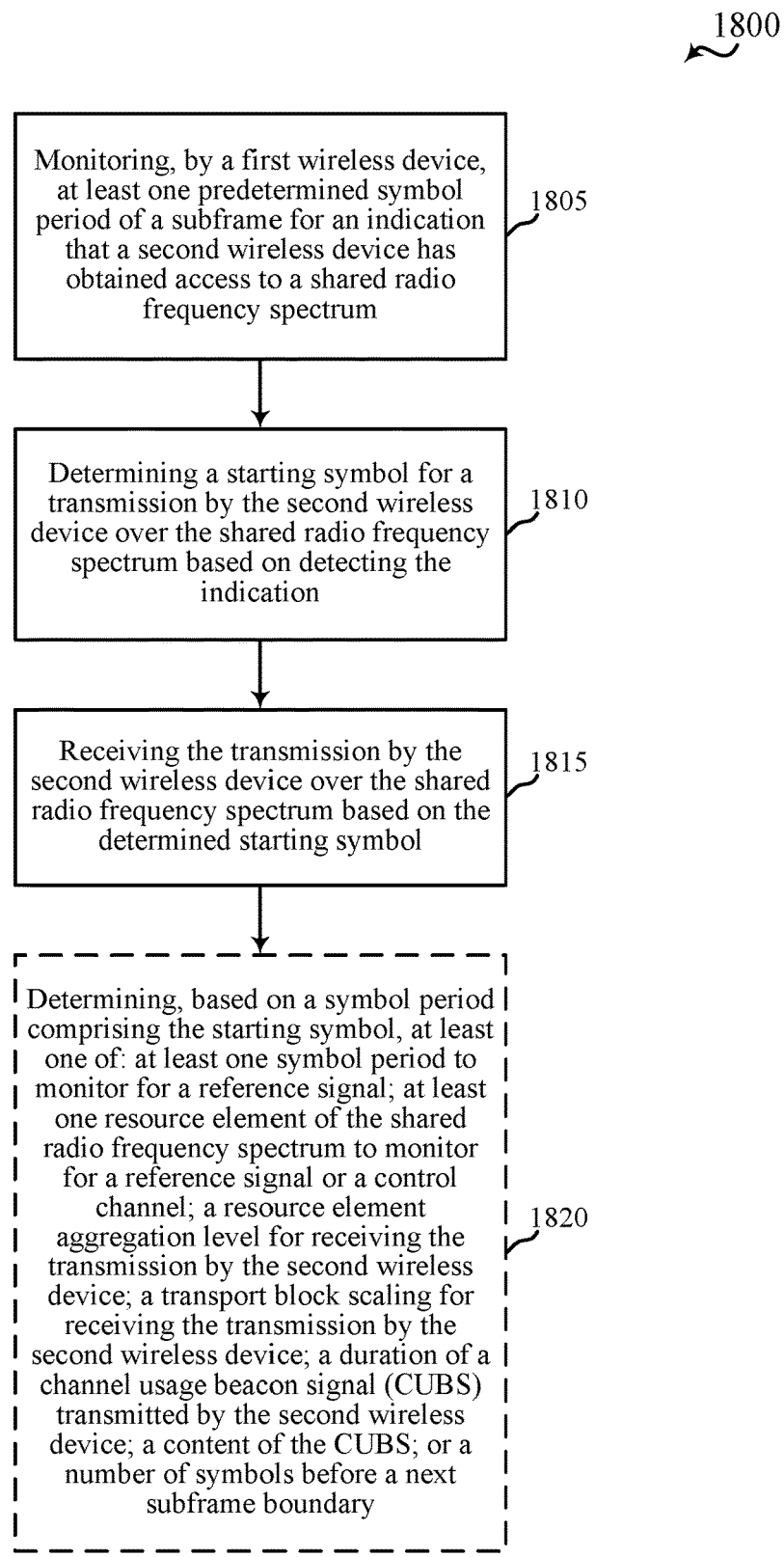
FIG. 18 is a flow chart illustrating an exemplary method for wireless communication, in accordance with various aspects of the present disclosure.

FIG. 18 is a flow chart illustrating an exemplary method 1800 for wireless communication, in accordance with various aspects of the present disclosure. For clarity, the method 1800 is described below with reference to aspects of one or more of the UEs 115, 215, 215-a, 215-b, 215-c, or 1615 described with reference to FIG. 1, 2, or 16, or aspects of one or more of the apparatuses 1015, 1115, 1215, or 1315 described with reference to FIG. 10, 11, 12, or 13. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1805, the method 1800 may include monitoring, by a first wireless device (e.g., a UE), at least one predetermined symbol period of a subframe for an indication that a second wireless device (e.g., a base station) has obtained access to a shared radio frequency spectrum. The shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner). The operation(s) at block 1805 may be performed using the wireless communication management module 1020, 1120, 1220, 1320, or 1660 described with reference to FIG. 10, 11, 12, 13, or 16, or the shared RF spectrum monitoring module 1035, 1135, 1235, or 1335 described with reference to FIG. 10, 11, 12, or 13.

At block 1810, the method 1800 may include determining a starting symbol for a transmission by the second wireless device over the shared radio frequency spectrum based on detecting the indication. The operation(s) at block 1810 may be performed using the wireless communication management module 1020, 1120, 1220, 1320, or 1660 described with reference to FIG. 10, 11, 12, 13, or 16, or the transmission starting symbol determination module 1045, 1145, 1245, or 1345 or transmission reception management module 1040, 1140, 1240, or 1340 described with reference to FIG. 10, 11, 12, or 13.

At block 1815, the method 1800 may include receiving the transmission by the second wireless device over the shared radio frequency spectrum based on the determined starting symbol. In some examples, the operation(s) performed at block 1815 may begin, before, during, or after the operation(s) performed at block 1810. The operation(s) at block 1815 may be performed using the wireless communication management module 1020, 1120, 1220, 1320, or 1660 described with reference to FIG. 10, 11, 12, 13, or 16, or the transmission reception management module 1040, 1140, 1240, or 1340 described with reference to FIG. 10, 11, 12, or 13.

At block 1820, the method 1800 may optionally include determining, based on a symbol period including the starting symbol, at least one of: at least one symbol period to monitor for a reference signal; at least one resource element of the shared radio frequency spectrum to monitor for a reference signal or a control channel; a resource element aggregation level for receiving the transmission by the second wireless device; a transport block scaling for receiving the transmission by the second wireless device; a duration of a CUBS transmitted by the second wireless device; a content of the CUBS; or a number of symbols before a next subframe boundary. The operation(s) at block 1820 may be performed using the wireless communication management module 1020, 1120, 1220, 1320, or 1660 described with reference to FIG. 10, 11, 12, 13, or 16, or the transmission reception management module 1040, 1140, 1240, or 1340 described with reference to FIG. 10, 11, 12, or 13.

Thus, the method 1800 may provide for wireless communication. It should be noted that the method 1800 is just one implementation and that the operations of the method 1800 may be rearranged or otherwise modified such that other implementations are possible.

Figure 19:
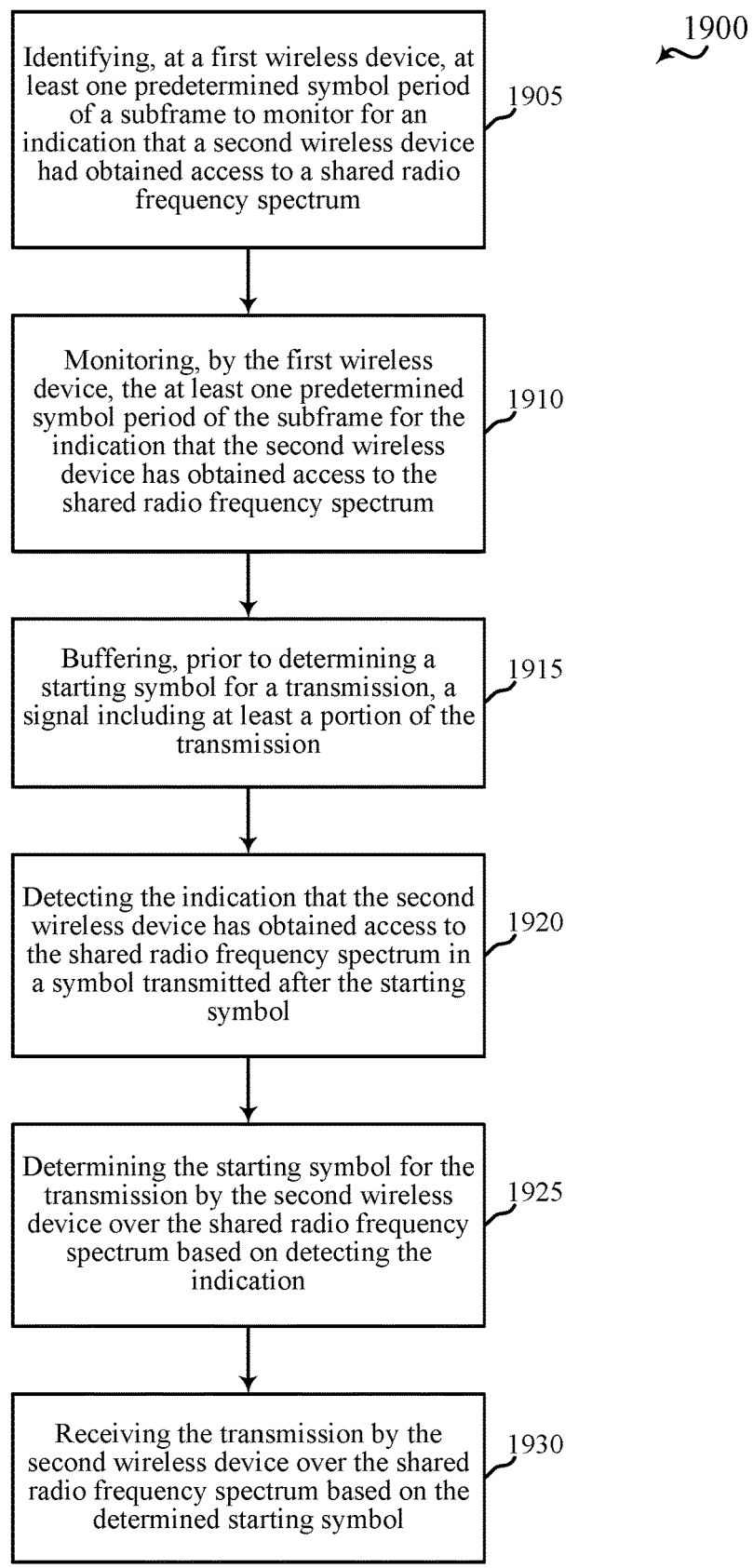
FIG. 19 is a flow chart illustrating an exemplary method for wireless communication, in accordance with various aspects of the present disclosure.

FIG. 19 is a flow chart illustrating an exemplary method 1900 for wireless communication, in accordance with various aspects of the present disclosure. For clarity, the method 1900 is described below with reference to aspects of one or more of the UEs 115, 215, 215-a, 215-b, 215-c, or 1615 described with reference to FIG. 1, 2, or 16, or aspects of one or more of the apparatuses 1015, 1115, 1215, or 1315 described with reference to FIG. 10, 11, 12, or 13. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1905, the method 1900 may include identifying (e.g., at a first wireless device, such as a UE) at least one predetermined symbol period of a subframe to monitor for an indication that a second wireless device (e.g., a base station) has obtained access to a shared radio frequency spectrum. In some examples, the at least one predetermined symbol period may be statically or semi-statically configured by an operator with which the first wireless device is associated. In some examples, the at least one predetermined symbol period may be configured by an operator with which the first wireless device is associated for one or more radio frames, one or more subframes of a radio frame, one or more transmissions, or until the at least on predetermined symbol period is changed. In some examples, the at least one predetermined symbol period may be identified (e.g., by the first wireless device) based on a duration of a radio frame including the subframe to be monitored. The shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner). The operation(s) at block 1905 may be performed using the wireless communication management module 1020, 1120, 1220, 1320, or 1660 described with reference to FIG. 10, 11, 12, 13, or 16, or the monitored symbol period identification module 1150 or 1250 described with reference to FIG. 11 or 12.

At block 1910, the method 1900 may include monitoring, by the first wireless device, the at least one predetermined symbol period of the subframe for the indication that the second wireless device has obtained access to the shared radio frequency spectrum. The operation(s) at block 1910 may be performed using the wireless communication management module 1020, 1120, 1220, 1320, or 1660 described with reference to FIG. 10, 11, 12, 13, or 16, or the shared RF spectrum monitoring module 1035, 1135, 1235, or 1335 described with reference to FIG. 10, 11, 12, or 13.

At block 1915, the method 1900 may include buffering, prior to determining a starting symbol for a transmission by the second wireless device over the shared radio frequency spectrum, a signal including at least a portion of the transmission. The operation(s) at block 1915 may be performed using the wireless communication management module 1020, 1120, 1220, 1320, or 1660 described with reference to FIG. 10, 11, 12, 13, or 16, the transmission reception management module 1040, 1140, 1240, or 1340 described with reference to FIG. 10, 11, 12, or 13, or the buffer management module 1155 described with reference to FIG. 11.

At block 1920, the method 1900 may include detecting the indication that the second wireless device has obtained access to the shared radio frequency spectrum in a symbol transmitted after the starting symbol. The operation(s) at block 1920 may be performed using the wireless communication management module 1020, 1120, 1220, 1320, or 1660 described with reference to FIG. 10, 11, 12, 13, or 16, the transmission reception management module 1040, 1140, 1240, or 1340 described with reference to FIG. 10, 11, 12, or 13, or the access detection module 1160 or 1260 described with reference to FIG. 11 or 12.

At block 1925, the method 1900 may include determining the starting symbol for the transmission by the second wireless device over the shared radio frequency spectrum based on detecting the indication. The operation(s) at block 1925 may be performed using the wireless communication management module 1020, 1120, 1220, 1320, or 1660 described with reference to FIG. 10, 11, 12, 13, or 16, or the transmission starting symbol determination module 1045, 1145, 1245, or 1345 or transmission reception management module 1040, 1140, 1240, or 1340 described with reference to FIG. 10, 11, 12, or 13.

At block 1930, the method 1900 may include receiving the transmission by the second wireless device over the shared radio frequency spectrum based on the determined starting symbol. In some examples, receiving the transmission by the second wireless device may include processing at least a portion of the signal buffered at block 1915. The operation(s) at block 1930 may be performed using the wireless communication management module 1020, 1120, 1220, 1320, or 1660 described with reference to FIG. 10, 11, 12, 13, or 16, or the transmission reception management module 1040, 1140, 1240, or 1340 described with reference to FIG. 10, 11, 12, or 13.

In some examples of the method 1900, a plurality of predetermined symbol periods may be identified at block 1905 and monitored at block 1910. In these examples, the indication may be detected, at block 1915, in one of the predetermined symbol periods.

Thus, the method 1900 may provide for wireless communication. It should be noted that the method 1900 is just one implementation and that the operations of the method 1900 may be rearranged or otherwise modified such that other implementations are possible.

Figure 20:
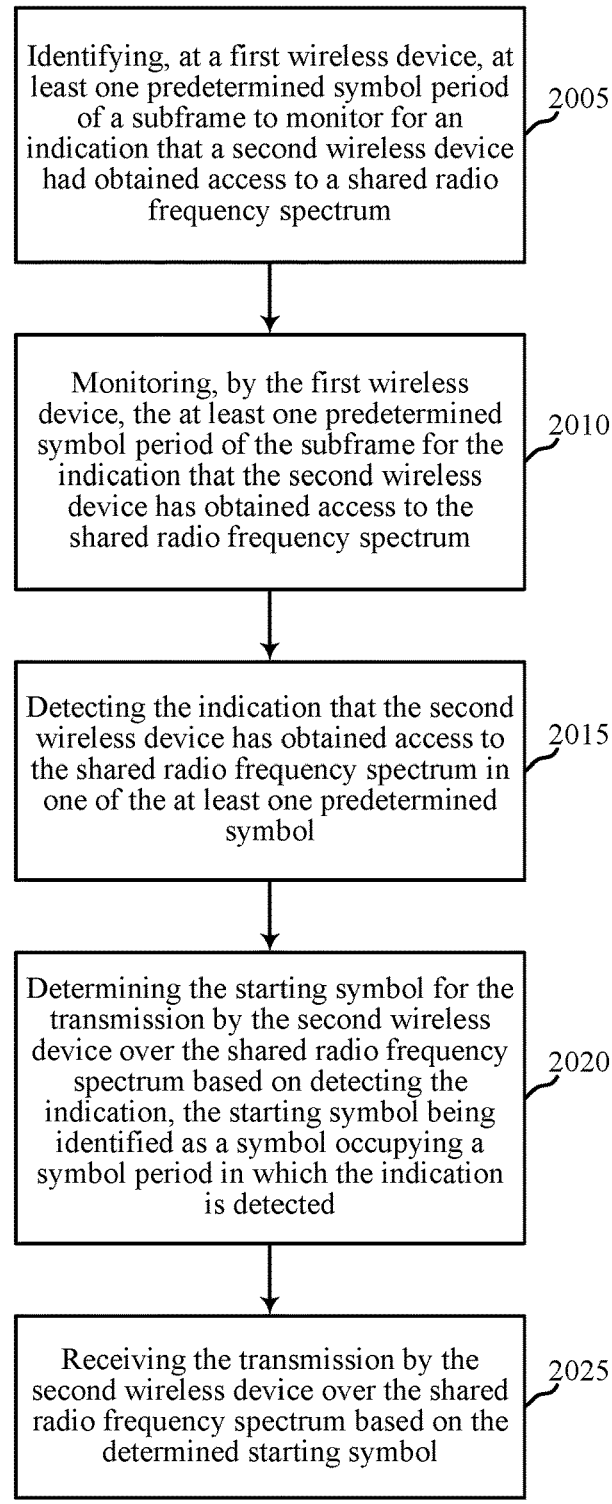
FIG. 20 is a flow chart illustrating an exemplary method for wireless communication, in accordance with various aspects of the present disclosure.

FIG. 20 is a flow chart illustrating an exemplary method 2000 for wireless communication, in accordance with various aspects of the present disclosure. For clarity, the method 2000 is described below with reference to aspects of one or more of the UEs 115, 215, 215-*a*, 215-*b*, 215-*c*, or 1615 described with reference to FIG. 1, 2, or 16, or aspects of one or more of the apparatuses 1015, 1115, 1215, or 1315 described with reference to FIG. 10, 11, 12, or 13. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 2005, the method 2000 may include identifying (e.g., at a first wireless device, such as a UE) at least one predetermined symbol period of a subframe to monitor for an indication that a second wireless device (e.g., a base station) has obtained access to a shared radio frequency spectrum. In some examples, the at least one predetermined symbol period may be statically or semi-statically configured by an operator with which the first wireless device is associated. In some examples, the at least one predetermined symbol period may be configured by an operator with which the first wireless device is associated for one or more radio frames, one or more subframes of a radio frame, one or more transmissions, or until the at least on predetermined symbol period is changed. In some examples, the at least one predetermined symbol period may be identified (e.g., by the first wireless device) based on a duration of a radio frame including the subframe to be monitored. The shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner). The operation(s) at block 2005 may be performed using the wireless communication management module 1020, 1120, 1220, 1320, or 1660 described with reference to FIG. 10, 11, 12, 13, or 16, or the monitored symbol period identification module 1150 or 1250 described with reference to FIG. 11 or 12.

At block 2010, the method 2000 may include monitoring, by the first wireless device, the at least one predetermined symbol period of the subframe for the indication that the second wireless device has obtained access to the shared radio frequency spectrum. In some examples, the indication may include an energy above a threshold on the shared radio frequency spectrum. The operation(s) at block 2010 may be performed using the wireless communication management module 1020, 1120, 1220, 1320, or 1660 described with reference to FIG. 10, 11, 12, 13, or 16, or the shared RF spectrum monitoring module 1035, 1135, 1235, or 1335 described with reference to FIG. 10, 11, 12, or 13.

At block 2015, the method 2000 may include detecting the indication that the second wireless device has obtained access to the shared radio frequency spectrum in one of the at least one predetermined symbol period. The operation(s) at block 2015 may be performed using the wireless communication management module 1020, 1120, 1220, 1320, or 1660 described with reference to FIG. 10, 11, 12, 13, or 16, the transmission reception management module 1040, 1140, 1240, or 1340 described with reference to FIG. 10, 11, 12, or 13, or the access detection module 1160 or 1260 described with reference to FIG. 11 or 12.

At block 2020, the method 2000 may include determining the starting symbol for the transmission by the second wireless device over the shared radio frequency spectrum based on detecting the indication. In some examples, determining the starting symbol may include identifying the starting symbol as a symbol occupying a symbol period in which the indication that the second wireless device has obtained access to the shared radio frequency spectrum is detected. The operation(s) at block 2020 may be performed using the wireless communication management module 1020, 1120, 1220, 1320, or 1660 described with reference to FIG. 10, 11, 12, 13, or 16, or the transmission starting symbol determination module 1045, 1145, 1245, or 1345 or transmission reception management module 1040, 1140, 1240, or 1340 described with reference to FIG. 10, 11, 12, or 13.

At block 2025, the method 2000 may include receiving the transmission by the second wireless device over the shared radio frequency spectrum based on the determined starting symbol. The operation(s) at block 2025 may be performed using the wireless communication management module 1020, 1120, 1220, 1320, or 1660 described with reference to FIG. 10, 11, 12, 13, or 16, or the transmission reception management module 1040, 1140, 1240, or 1340 described with reference to FIG. 10, 11, 12, or 13.

In some examples of the method 2000, a plurality of predetermined symbol periods may be identified at block 2005 and monitored at block 2010. In these examples, the indication may be detected, at block 2015, in one of the predetermined symbol periods.

Thus, the method 2000 may provide for wireless communication. It should be noted that the method 2000 is just one implementation and that the operations of the method 2000 may be rearranged or otherwise modified such that other implementations are possible.

Figure 21:
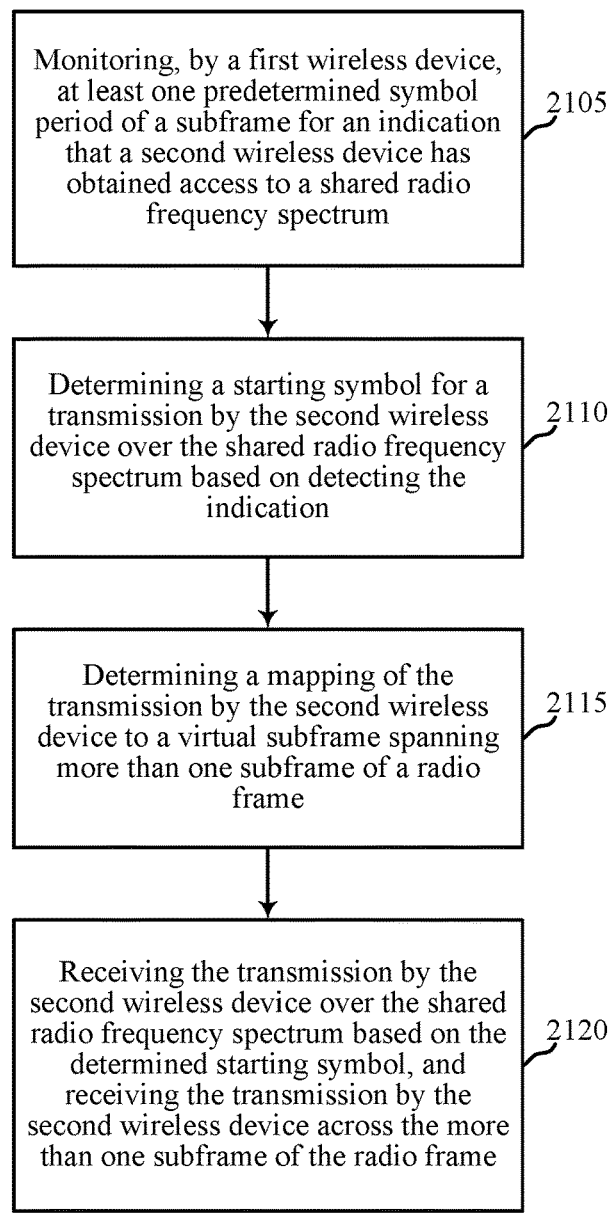
FIG. 21 is a flow chart illustrating an exemplary method for wireless communication, in accordance with various aspects of the present disclosure.

FIG. 21 is a flow chart illustrating an exemplary method 2100 for wireless communication, in accordance with various aspects of the present disclosure. For clarity, the method 2100 is described below with reference to aspects of one or more of the UEs 115, 215, 215-a, 215-b, 215-c, or 1615 described with reference to FIG. 1, 2, 16, or aspects of one or more of the apparatuses 1015, 1115, 1215, or 1315 described with reference to FIG. 10, 11, 12, or 13. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 2105, the method 2100 may include monitoring, by a first wireless device (e.g., a UE), at least one predetermined symbol period of a subframe for an indication that a second wireless device (e.g., a base station) has obtained access to a shared radio frequency spectrum. The shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner). The operation(s) at block 2105 may be performed using the wireless communication management module 1020, 1120, 1220, 1320, or 1660 described with reference to FIG. 10, 11, 12, 13, or 16, or the shared RF spectrum monitoring module 1035, 1135, 1235, or 1335 described with reference to FIG. 10, 11, 12, or 13.

At block 2110, the method 2100 may include determining a starting symbol for a transmission by the second wireless device over the shared radio frequency spectrum based on detecting the indication. The operation(s) at block 2110 may be performed using the wireless communication management module 1020, 1120, 1220, 1320, or 1660 described with reference to FIG. 10, 11, 12, 13, or 16, or the transmission starting symbol determination module 1045, 1145, 1245, or 1345 or transmission reception management module 1040, 1140, 1240, or 1340 described with reference to FIG. 10, 11, 12, or 13.

At block 2115, the method 2100 may include determining a mapping of the transmission by the second wireless device to a virtual subframe spanning more than one subframe of a radio frame. The operation(s) at block 2115 may be performed using the wireless communication management module 1020, 1120, 1220, 1320, or 1660 described with reference to FIG. 10, 11, 12, 13, or 16, the transmission reception management module 1040, 1140, 1240, or 1340 described with reference to FIG. 10, 11, 12, or 13, or the virtual subframe mapping determination module 1350 described with reference to FIG. 13.

At block 2120, the method 2100 may include receiving the transmission by the second wireless device over the shared radio frequency spectrum based on the determined starting symbol. The transmission may be received across the more than one subframe of the radio frame (i.e., according to the mapping of the transmission to the virtual subframe, as determined at block 2115). The operation(s) at block 2120 may be performed using the wireless communication management module 1020, 1120, 1220, 1320, or 1660 described with reference to FIG. 10, 11, 12, 13, or 16, or the transmission reception management module 1040, 1140, 1240, or 1340 described with reference to FIG. 10, 11, 12, or 13.

In some examples, the method 2100 may include receiving a reference signal as part of the transmission by the second wireless device, and a timing of receiving the reference signal may be determined by a format of a subframe of the radio frame.

Thus, the method 2100 may provide for wireless communication. It should be noted that the method 2100 is just one implementation and that the operations of the method 2100 may be rearranged or otherwise modified such that other implementations are possible.

In some examples, aspects of two or more of the methods 1800, 1900, 2000, or 2100 described with reference to FIG. 18, 19, 20, or 21 may be combined.

Figure 22:
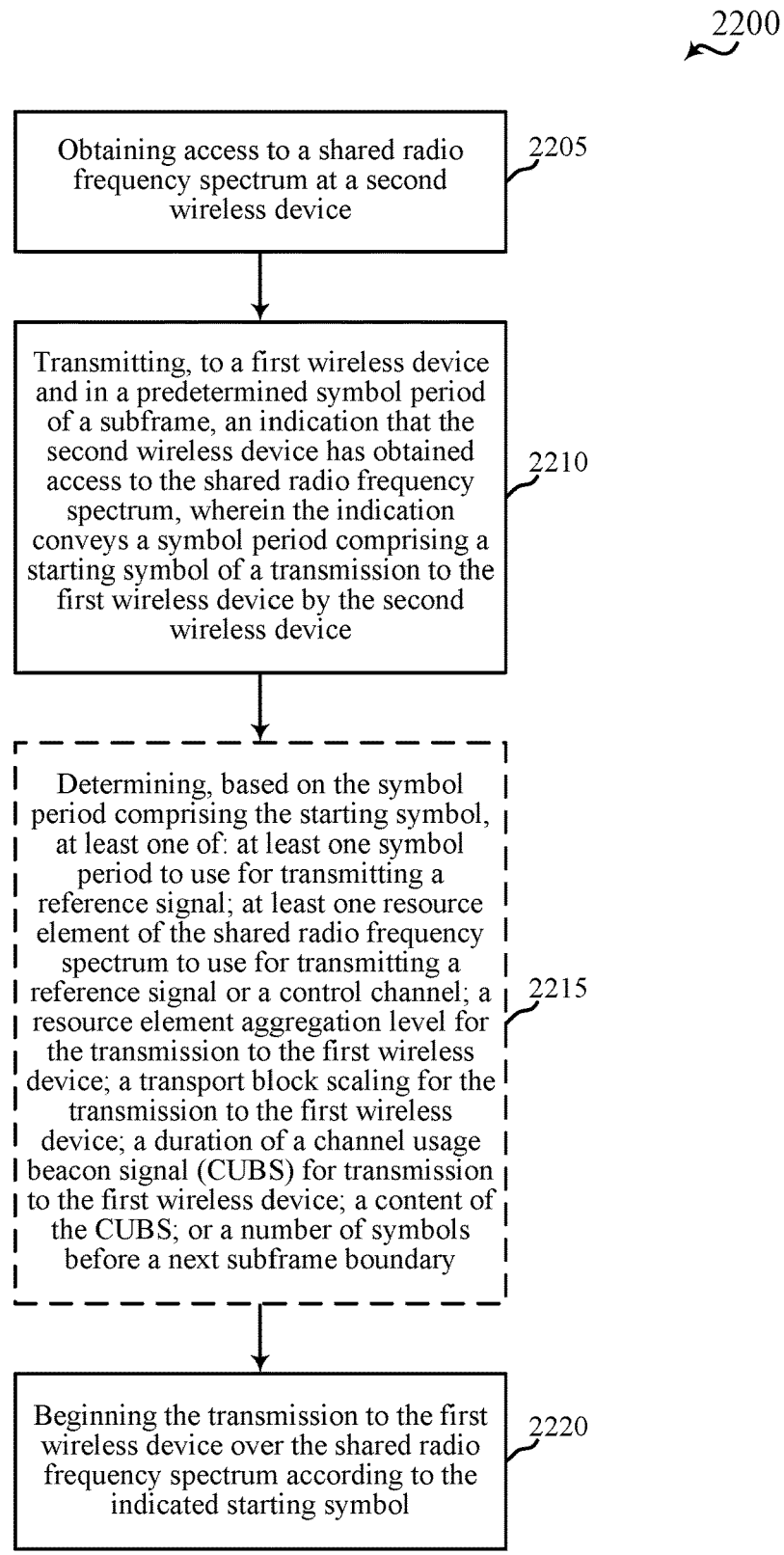
FIG. 22 is a flow chart illustrating an exemplary method for wireless communication, in accordance with various aspects of the present disclosure.

FIG. 22 is a flow chart illustrating an exemplary method 2200 for wireless communication, in accordance with various aspects of the present disclosure. For clarity, the method 2200 is described below with reference to aspects of one or more of the base stations 105, 205, 205-a, or 1705 described with reference to FIG. 1, 2, or 17, or aspects of one or more of the apparatuses 1405 or 1505 described with reference to FIG. 14 or 15. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 2205, the method 2200 may include obtaining access to a shared radio frequency spectrum at a second wireless device (e.g., a base station). The shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner). In some examples, obtaining access to the shared radio frequency spectrum may include successfully performing a CCA procedure. The operation(s) at block 2205 may be performed using the wireless communication management module 1420, 1520, or 1760 described with reference to FIG. 14, 15, or 17, or the channel contention module 1435 or 1535 described with reference to FIG. 14 or 15.

At block 2210, the method 2200 may include transmitting, to a first wireless device (e.g., a UE) and in a predetermined symbol period of a subframe, an indication that the second wireless device has obtained access to the shared radio frequency spectrum. The indication may convey a symbol period comprising a starting symbol of a transmission to the first wireless device by the second wireless device. In some examples, the predetermined symbol period may include the starting symbol of the transmission to the first wireless device. In some examples, the method 2200 may include selecting the predetermined symbol period based on a duration of a radio frame including the transmission. The operation(s) at block 2210 may be performed using the wireless communication management module 1420, 1520, or 1760 described with reference to FIG. 14, 15, or 17, or the transmission management module 1440 or 1540 or access and starting symbol indication module 1445 or 1545 described with reference to FIG. 14 or 15.

At block 2215, the method 2200 may optionally include determining, based on the symbol period including the starting symbol, at least one of: at least one symbol period to use for transmitting a reference signal; at least one resource element of the shared radio frequency spectrum to use for transmitting a reference signal or a control channel; a resource element aggregation level for the transmission to the first wireless device; a transport block scaling for the transmission to the first wireless device; a duration of a CUBS; a content of the CUBS; or a number of symbols before a next subframe boundary. The operation(s) at block 1820 may be performed using the wireless communication management module 1420, 1520, or 1760 described with reference to FIG. 14, 15, or 17, or the transmission reception management module 1040, 1140, 1240, or 1340 described with reference to FIG. 10, 11, 12, or 13.

At block 2220, the method 2200 may include beginning the transmission to the first wireless device over the shared radio frequency spectrum according to the indicated starting symbol. The operation(s) at block 2220 may be performed using the wireless communication management module 1420, 1520, or 1760 described with reference to FIG. 14, 15, or 17, or the transmission management module 1440 or 1540 described with reference to FIG. 14 or 15.

In some examples, the method 2200 may include beginning the transmission to the first wireless device, at block 2220, before transmitting the indication that the second wireless device has obtained access to the shared radio frequency spectrum, at block 2210.

In some examples of the method 2200, the transmission to the first wireless device may include a PDCCH, and the method 2200 may include adjusting a transmit power for the PDCCH based on the symbol period comprising the starting symbol.

Thus, the method 2200 may provide for wireless communication. It should be noted that the method 2200 is just one implementation and that the operations of the method 2200 may be rearranged or otherwise modified such that other implementations are possible.

Figure 23:
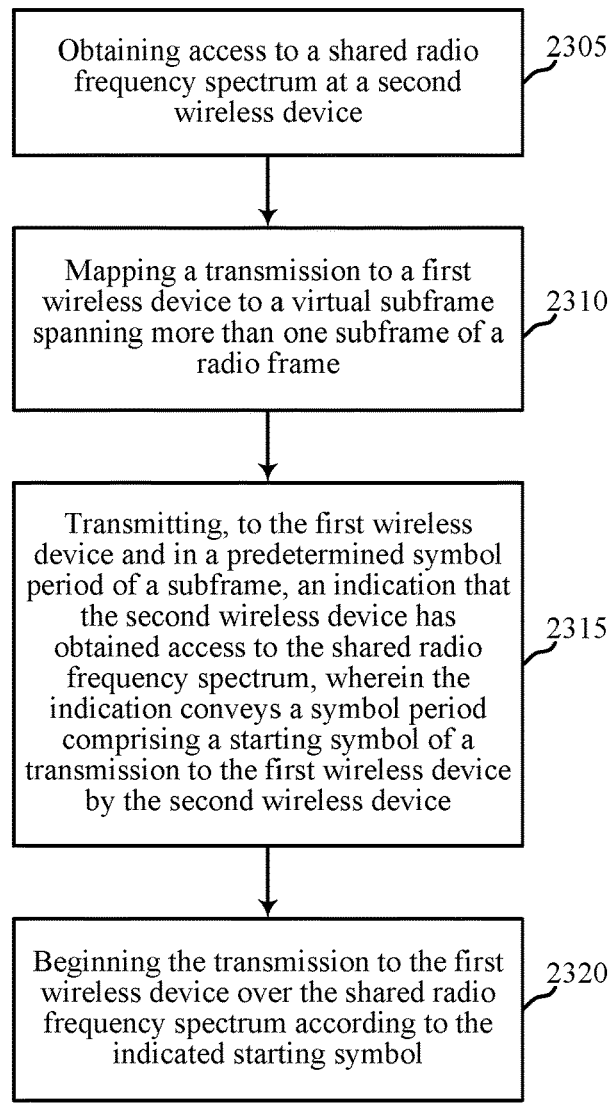
FIG. 23 is a flow chart illustrating an exemplary method for wireless communication, in accordance with various aspects of the present disclosure.

FIG. 23 is a flow chart illustrating an exemplary method 2300 for wireless communication, in accordance with various aspects of the present disclosure. For clarity, the method 2300 is described below with reference to aspects of one or more of the base stations 105, 205, 205-*a*, or 1705 described with reference to FIG. 1, 2, or 17, or aspects of one or more of the apparatuses 1405 or 1505 described with reference to FIG. 14 or 15. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 2305, the method 2300 may include obtaining access to a shared radio frequency spectrum at a second wireless device (e.g., a base station). The shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner). In some examples, obtaining access to the shared radio frequency spectrum may include successfully performing a CCA procedure. The operation(s) at block 2305 may be performed using the wireless communication management module 1420, 1520, or 1760 described with reference to FIG. 14, 15, or 17, or the channel contention module 1435 or 1535 described with reference to FIG. 14 or 15.

At block 2310, the method 2300 may include mapping a transmission to a first wireless device (e.g., a UE) to a virtual subframe spanning more than one subframe of a radio frame. The operation(s) at block 2310 may be performed using the wireless communication management module 1420, 1520, or 1760 described with reference to FIG. 14, 15, or 17, or the virtual subframe mapping module 1550 described with reference to FIG. 15.

At block 2315, the method 2300 may include transmitting, to a first wireless device (e.g., a UE) and in a predetermined symbol period of a subframe, an indication that the second wireless device has obtained access to the shared radio frequency spectrum. The indication may convey a symbol period comprising a starting symbol of a transmission to the first wireless device by the second wireless device. In some examples, the predetermined symbol period may include the starting symbol of the transmission to the first wireless device. In some examples, the method 2300 may include selecting the predetermined symbol period based on a duration of a radio frame including the transmission. The operation(s) at block 2315 may be performed using the wireless communication management module 1420, 1520, or 1760 described with reference to FIG. 14, 15, or 17, or the transmission management module 1440 or 1540 or access and starting symbol indication module 1445 or 1545 described with reference to FIG. 14 or 15.

At block 2320, the method 2300 may include beginning the transmission to the first wireless device over the shared radio frequency spectrum according to the indicated starting symbol. In some examples, beginning the transmission to the first wireless device may include transmitting the virtual subframe to the first wireless device. The operation(s) at block 2320 may be performed using the wireless communication management module 1420, 1520, or 1760 described with reference to FIG. 14, 15, or 17, or the transmission management module 1440 or 1540 described with reference to FIG. 14 or 15.

In some examples, the method 2300 may include beginning the transmission to the first wireless device, at block 2320, before transmitting the indication that the second wireless device has obtained access to the shared radio frequency spectrum, at block 2310.

In some examples of the method 2300, the virtual subframe may include a reference signal, and the reference signal may have a timing determined by a format of a subframe of the radio frame.

In some examples of the method 2300, the transmission to the first wireless device may include a PDCCH, and the method 2300 may include adjusting a transmit power for the PDCCH based on the symbol period including the starting symbol.

Thus, the method 2300 may provide for wireless communication. It should be noted that the method 2300 is just one implementation and that the operations of the method 2300 may be rearranged or otherwise modified such that other implementations are possible.

In some examples, aspects of the methods 2200 and 2300 described with reference to FIGS. 22 and 23 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can include RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
   determining, by a user equipment (UE), to monitor at least one indicated symbol period of a subframe for a channel usage signal comprising an indication that a base station has obtained access to a channel of a shared radio frequency spectrum;
   monitoring the channel of the shared radio frequency spectrum, by the UE, for the at least one indicated symbol period of the subframe for the channel usage signal comprising the indication that the base station has obtained access to the channel of the shared radio frequency spectrum;
   determining, by the UE, a symbol period from a plurality of possible symbol periods for a start of a transmission by the base station over the channel of the shared radio frequency spectrum based on detecting the channel usage signal comprising the indication; and
   monitoring, by the UE, for the transmission from the base station over the channel of the shared radio frequency spectrum based on the determined symbol period from a plurality of possible symbol periods for the start of the transmission and based at least in part on the channel usage signal comprising the indication.

2. The method of claim 1, further comprising:
   detecting, by the UE, the channel usage signal comprising the indication that the base station has obtained access to the channel of the shared radio frequency spectrum in a symbol transmitted after the symbol period for the start of the transmission.

3. The method of claim 1, wherein the monitoring the at least one symbol period of the subframe comprises monitoring a plurality of symbol periods, the method further comprising:
   detecting the channel usage signal comprising the indication that the base station has obtained access to the channel of the shared radio frequency spectrum in one of the plurality of symbol periods.

4. The method of claim 1, further comprising:
   detecting the channel usage signal comprising the indication that the base station has obtained access to the channel of the shared radio frequency spectrum in the symbol period for the start of the transmission, wherein the channel usage signal comprising the indication is included with the transmission from the base station.

5. The method of claim 1, further comprising:
   identifying the at least one symbol period of the subframe based on a duration of a radio frame comprising the subframe.

6. The method of claim 1, further comprising:
   determining, based on the symbol period for the start of the transmission, at least one of:
   at least one symbol period to monitor for a reference signal;
   at least one resource element of the shared radio frequency spectrum to monitor for the reference signal or a control channel;
   a resource element aggregation level for receiving the transmission by the base station;
   a transport block scaling for receiving the transmission by the base station;
   a duration of a channel usage beacon signal (CUBS) transmitted by the base station;
   a content of the CUBS;
   or a number of symbols before a next subframe boundary.

7. The method of claim 1, further comprising:
   determining a mapping of the transmission by the base station to a virtual subframe spanning more than one subframe of a radio frame;
   wherein monitoring for the transmission from the base station comprises receiving the transmission across the more than one subframe of the radio frame.

8. The method of claim 7, further comprising:
   receiving a reference signal as part of the transmission from the base station, wherein a timing of receiving the reference signal is determined by a format of a subframe of the radio frame.

9. The method of claim 1, further comprising:
   receiving, from a base station, radio resource control (RRC) signaling indicating at least one symbol period of a subframe to monitor for a channel usage signal.

10. A user equipment (UE) for wireless communication, comprising:
    a processor;
    memory in electronic communication with the processor; and
    instructions stored in the memory, the instructions being executable by the processor to:
    determine to monitor at least one indicated symbol period of a subframe for a channel usage signal comprising an indication that a base station has obtained access to a channel of a shared radio frequency spectrum;
    monitor the channel of the shared radio frequency spectrum for the at least one indicated symbol period of the subframe for the channel usage signal comprising the indication that the base station has obtained access to the channel of the shared radio frequency spectrum;
    determine a symbol period from a plurality of possible symbol periods for a start of a transmission by the base station over the channel of the shared radio frequency spectrum based on detecting the channel usage signal comprising the indication; and monitor for the transmission from the base station over the channel of the shared radio frequency spectrum based on the determined symbol period from a plurality of possible symbol periods for the start of the transmission and based at least in part on the channel usage signal comprising the indication.

11. The UE of claim 10, wherein the instructions are further executable by the processor to:

detect the channel usage signal comprising the indication that the base station has obtained access to the channel of the shared radio frequency spectrum in a symbol transmitted after the symbol period for the start of the transmission.

12. The UE of claim 10, wherein the instructions executable by the processor to monitor the at least one symbol period of the subframe comprise instructions executable by the processor to:

monitor a plurality of symbol periods; and detect the channel usage signal comprising the indication that the base station has obtained access to the channel of the shared radio frequency spectrum in one of the plurality of symbol periods.

13. The UE of claim 10, wherein the instructions are further executable by the processor to:

detect the channel usage signal comprising the indication that the base station has obtained access to the channel of the shared radio frequency spectrum in the symbol period for the start of the transmission, wherein the channel usage signal comprising the indication is included with the transmission from the base station.

14. The UE of claim 10, wherein the instructions are further executable by the processor to:

identify the at least one symbol period of the subframe based on a duration of a radio frame comprising the subframe.

15. The UE of claim 10, wherein the instructions are further executable by the processor to:

determine, based on the symbol period for the start of the transmission, at least one of: at least one symbol period to monitor for a reference signal;

at least one resource element of the shared radio frequency spectrum to monitor for the reference signal or a control channel;

a resource element aggregation level for receiving the transmission by the base station;

a transport block scaling for receiving the transmission by the base station;

a duration of a channel usage beacon signal (CUBS) transmitted by the base station;

a content of the CUBS;

or a number of symbols before a next subframe boundary.

16. The UE of claim 10, wherein the instructions are further executable by the processor to:

determine a mapping of the transmission by the base station to a virtual subframe spanning more than one subframe of a radio frame;

wherein monitoring for the transmission from the base station comprises receiving the transmission across the more than one subframe of the radio frame.

17. The UE of claim 10, wherein the instructions are further executable by the processor to:

receive a reference signal as part of the transmission from the base station, wherein a timing of receiving the reference signal is determined by a format of a subframe of the radio frame.

* * * * *